(12) United States Patent
Oizumi et al.

(10) Patent No.: US 8,908,657 B2
(45) Date of Patent: Dec. 9, 2014

(54) TRANSMISSION DEVICE AND TRANSMISSION METHOD

(75) Inventors: Toru Oizumi, Osaka (JP); Seigo Nakao, Kanagawa (JP); Ayako Horiuchi, Kanagawa (JP); Daichi Imamura, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 77 days.

(21) Appl. No.: 13/820,221

(22) PCT Filed: Sep. 29, 2011

(86) PCT No.: PCT/JP2011/005505
§ 371 (c)(1),
(2), (4) Date: Mar. 1, 2013

(87) PCT Pub. No.: WO2012/042889
PCT Pub. Date: Apr. 5, 2012

(65) Prior Publication Data
US 2013/0163573 A1 Jun. 27, 2013

(30) Foreign Application Priority Data

Sep. 30, 2010 (JP) .................................. 2010-221368
Aug. 10, 2011 (JP) .................................. 2011-174891

(51) Int. Cl.
*H04J 3/00* (2006.01)
*H04W 72/04* (2009.01)
*H04L 5/00* (2006.01)

(52) U.S. Cl.
CPC ......... *H04W 72/0446* (2013.01); *H04L 5/0007* (2013.01); *H04L 5/0053* (2013.01); *H04L 5/0091* (2013.01); *H04W 72/042* (2013.01)
USPC ............ 370/336; 370/338; 370/341; 370/345

(58) Field of Classification Search
CPC ..................................................... H04W 72/042
USPC .......................... 370/242, 315, 329, 331, 338
See application file for complete search history.

(56) References Cited

U.S. PATENT DOCUMENTS

2012/0082145 A1\* 4/2012 Chen et al. ..................... 370/338
2012/0099519 A1\* 4/2012 Kim et al. ...................... 370/315

(Continued)

OTHER PUBLICATIONS

3GPP TS 36.211 V9.1.0, "Physical Channels and Modulation (Release 9)," May 2010.

(Continued)

*Primary Examiner* — Brian D Nguyen
*Assistant Examiner* — Toan Nguyen
(74) *Attorney, Agent, or Firm* — Pearne & Gordon LLP

(57) ABSTRACT

Provided are a transmission device and transmission method that are capable of allowing leeway in data reception processing on the receiving side regardless of the position in time of a resource region to which control information, which is contained in resource allocation information for transmission data, is mapped. A setting unit (101) sets a mapping region, which maps a DCI in accordance with the downlink data size that the DCI indicates, from among a PDCCH region, an R-PDCCH region in slot 0, and an R-PDCCH region in slot 1 that are provided in order in the time direction within a subframe. In a setting rule table used in setting the mapping region, PDCCH region, R-PDCCH region in slot 0, and R-PDCCSH region in slot 1 are associated with maximum size value of a downlink data size that the DCI indicates and that can be set in each resource region.

16 Claims, 20 Drawing Sheets

(56) References Cited

U.S. PATENT DOCUMENTS

| | | | |
|---|---|---|---|
| 2013/0107845 A1* | 5/2013 | Pi et al. | 370/329 |
| 2013/0107861 A1* | 5/2013 | Cheng et al. | 370/331 |
| 2013/0155872 A1* | 6/2013 | Subramanian et al. | 370/242 |

OTHER PUBLICATIONS

3GPP TS 36.212 V9.2.0, "Multiplexing and channel coding (Release 9)," Jun. 2010.
3GPP TS 36.213 V9.2.0, "Physical layer procedures (Release 9),"Jun. 2010.
3GPP TSG RAN WG1 meeting, R1-092641, "PDCCH design for Carrier aggregation and Post Rel-8 features," Jun. 2009.
3GPP TSG RAN WG1 meeting, R1-102700, "Backhaul Control Channel Design in Downlink," May 2010.
3GPP TSG RAN WG1 meeting, R1-102881, "R-PDCCH placement," May 2010.
3GPP TSG RAN WG1 meeting, R1-103040, "R-PDCCH search space design," May 2010.
3GPP TSG RAN WG1 meeting, R1-103062, "Supporting frequency diversity and frequency selective R-PDCCH transmissions," May 2010.
Panasonic, R-PDCCH search space design, 3GPP TSG RAN WG1 Meeting #62, R1-104911, Aug. 2010, pp. I-7.
Catt, Details on R-PDCCH search space and blind decoding in LTE-A, 3GPP TSG RAN WGI Meeting #62, R1-104338, Aug. 2010, pp. 1-3.
Panasonic, DCI formats for R-PDCCH, 3GPP TSG RAN WG1 Meeting #61bis, R1-103776, Jun. 2010, pp. 1-3.
International Search Report fpr Application No. PCT/JP2011/005505 dated Dec. 27, 2011.

* cited by examiner

| I_TBS | 91 | 92 | 93 | 94 | 95 | 96 | 97 | 98 | 99 | 100 |
|---|---|---|---|---|---|---|---|---|---|---|
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

FIG. 9

WHEN N_PRB IS FROM 81 TO 90

| I_MCS | Modulation order | I_TBS |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | |

Rows 0–11: REGION3; Rows 12–25: REGION2; Rows 26–31: REGION1

FIG. 15A

WHEN N_PRB IS FROM 91 TO 100

| I_MCS | Modulation order | I_TBS |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | |

Rows 0–10: REGION3; Rows 11–24: REGION2; Rows 25–31: REGION1

FIG. 15B

DISPOSING EXAMPLE OF NUMBER OF BLIND DECODING OPERATIONS 1

| Number of CCEs | Number of candidates in PDCCH UE-SS | Number of candidates in R-PDCCH UE-SS |
|---|---|---|
| 1 | 6 | 0 |
| 2 | 6 | 0 |
| 4 | 2 | 0 |
| 8 | 2 | 0 |

FIG. 20A

DISPOSING EXAMPLE OF NUMBER OF BLIND DECODING OPERATIONS 2

| Number of CCEs | Number of candidates in PDCCH UE-SS | Number of candidates in R-PDCCH UE-SS |
|---|---|---|
| 1 | 4 | 2 |
| 2 | 4 | 2 |
| 4 | 1 | 1 |
| 8 | 1 | 1 |

FIG. 20B

DISPOSING EXAMPLE OF NUMBER OF BLIND DECODING OPERATIONS 3

| Number of CCEs | Number of candidates in PDCCH UE-SS | Number of candidates in R-PDCCH UE-SS |
|---|---|---|
| 1 | 2 | 4 |
| 2 | 2 | 4 |
| 4 | 1 | 1 |
| 8 | 1 | 1 |

FIG. 20C

DISPOSING EXAMPLE OF NUMBER OF BLIND DECODING OPERATIONS 4

| Number of CCEs | Number of candidates in PDCCH UE-SS | Number of candidates in R-PDCCH UE-SS |
|---|---|---|
| 1 | 0 | 6 |
| 2 | 0 | 6 |
| 4 | 0 | 2 |
| 8 | 0 | 2 |

FIG. 20D

DETERMINATION OF DISPOSING METHOD BASED ON TA VALUE

| TA VALUE (ms) | DISPOSING METHOD OF NUMBER OF BLIND DECODING OPERATIONS |
|---|---|
| $0.495 \leq t_{TA} \leq 0.66$ | DISPOSING EXAMPLE 1 |
| $0.33 \leq t_{TA} < 0.495$ | DISPOSING EXAMPLE 2 |
| $0.165 \leq t_{TA} < 0.33$ | DISPOSING EXAMPLE 3 |
| $0 \leq t_{TA} < 0.165$ | DISPOSING EXAMPLE 4 |

FIG. 20E

TRANSMISSION DEVICE AND TRANSMISSION METHOD

TECHNICAL FIELD

The claimed invention relates to a transmission apparatus and a transmission method.

BACKGROUND ART

In 3rd Generation Partnership Project Radio Access Network Long Term Evolution (3GPP-LTE (hereinafter referred to as LTE)), Orthogonal Frequency Division Multiple Access (OFDMA) is adopted as a downlink communication scheme, and Single Carrier Frequency Division Multiple Access (SC-FDMA) is adopted as an uplink communication scheme (e.g., see NPL-1, NPL-2, and NPL-3).

In LTE, a base station apparatus for radio communications (hereinafter abbreviated as "base station") performs communications by allocating a resource block (RB) in a system band to a terminal apparatus for radio communications (hereinafter abbreviated as "terminal") for every time unit called "subframe." The base station also transmits allocation control information (i.e., L1/L2 control information) for the notification of the result of resource allocation of downlink data and uplink data to the terminal. The allocation control information is transmitted to the terminal through a downlink control channel such as a Physical Downlink Control Channel (PDCCH). A resource region to which a PDCCH is to be mapped is specified. As shown in FIG. 1, a PDCCH covers the entire system bandwidth in the frequency-domain and the region occupied by the PDCCH in the time-domain varies between a leading first OFDM symbol and a third OFDM symbol in a single subframe. A signal indicating a range of OFDM symbols occupied by a PDCCH in the time-domain direction is transmitted through a Physical Control Format Indicator Channel (PCFICH).

Each PDCCH also occupies a resource composed of one or more consecutive control channel elements (CCEs). In a PDCCH, one CCE consists of 36 resource elements (RE). In LTE, the number of CCEs occupied by a PDCCH (CCE aggregation level, or simply aggregation level) is selected from 1, 2, 4, and 8 depending on the number of bits of allocation control information or the condition of a propagation path of a terminal. In LTE a frequency band having a system bandwidth of up to 20 MHz is supported.

Allocation control information transmitted from a base station is referred to as downlink control information (DCI). If a base station allocates a plurality of terminals to one subframe, the base station transmits a plurality of items of DCI simultaneously. In this case, in order to identify a terminal to which each item of DCI is transmitted, the base station transmits the DCI with CRC bits included therein, the bits being masked (or scrambled) with a terminal ID of the transmission destination terminal. Then, the terminal performs demasking (or descrambling) on the CRC bits of a plurality of items of possible DCI directed to the terminal with its own ID, thereby blind-decoding a PDCCH to detect the DCI directed to the terminal.

DCI also includes information (resource allocation information (for example, the number of allocated resource blocks)) regarding a Physical Downlink Shared Channel (PDSCH) resource and a Physical Uplink Shared Channel (PDSCH) resource allocated to a terminal by a base station. In addition, DCI includes a Modulation and channel Coding Scheme (MCS) (for example, information showing an M-ary modulation number and/or a transport block size with respect to the number of allocated resource blocks) allocated to a terminal by a base station and the like. Furthermore, DCI has a plurality of formats for uplink, downlink Multiple Input Multiple Output (MIMO) transmission, and downlink non-consecutive band allocation. A terminal needs to receive both downlink allocation control information (i.e., allocation control information about a downlink) and uplink allocation control information (i.e., allocation control information about an uplink) which have a plurality of formats.

For example, for the downlink allocation control information, formats of a plurality of sizes are defined depending on a method for controlling a transmission antenna of a base station and a method for allocating a resource. Among the formats, a downlink allocation control information format for consecutive band allocation (hereinafter simply referred to as "downlink allocation control information") and an uplink allocation control information format for consecutive band allocation (hereinafter simply referred to as "uplink allocation control information") have the same size. These formats (i.e., DCI formats) include type information (for example, a one-bit flag) indicating the type of allocation control information (downlink allocation control information or uplink allocation control information). Thus, even if DCI indicating downlink allocation control information and DCI indicating uplink allocation control information have the same size, a terminal can determine whether specific DCI indicates downlink allocation control information or uplink allocation control information by checking type information included in allocation control information.

The DCI format in which uplink allocation control information for consecutive band allocation is transmitted is referred to as "DCI format 0" (hereinafter referred to as "DCI 0"), and the DCI format in which downlink allocation control information for consecutive band allocation is transmitted is referred to as "DCI format 1A" (hereinafter referred to as "DCI 1A"). Since DCI 0 and DCI 1A are of the same size and distinguishable from each other by referring to type information as described above, hereinafter, DCI 0 and DCI 1A will be collectively referred to as DCI 0/1A.

In addition to these DCI formats, there are other formats for downlink, such as DCI format 1 used for non-consecutive band allocation (hereinafter referred to as DCI 1) and DCI formats 2 and 2A used for allocating spatial multiplexing MIMO transmission (hereinafter referred to as DCI 2 and 2A). DCI 1, DCI 2, and DCI 2A are formats that are dependent on a downlink transmission mode of a terminal (non-consecutive band allocation or spatial multiplexing MIMO transmission) and configured for each terminal. In contrast, DCI 0/1A is a format that is independent of the transmission mode and can be used for a terminal having any transmission mode, i.e., a format commonly used for every terminal. If DCI 0/1A is used, single-antenna transmission or a transmit diversity scheme is used as a default transmission mode.

Also, the standardization of 3GPP LTE-Advanced (hereinafter referred to as LTE-A), which provides a data transfer rate higher than that of LTE, has been started while having backward compatibility with LTE. In LTE-A, in order to achieve a downlink transfer rate of up to 1 Gbps and an uplink transfer rate of up to 500 Mbps, base stations and terminals (hereinafter referred to as LTE-A terminals) capable of communicating at a wideband frequency of 40 MHz or higher will be introduced. An LTE-A system is also required to support terminals designed for an LTE system (hereinafter referred to as LTE terminals) in the system in addition to LTE-A terminals.

Additionally, in LTE-A, to achieve an increased coverage, the introduction of radio communication relay apparatus (hereinafter referred to as "relay station" or "Relay Node" (RN)) has been specified (see FIG. 2). Accordingly, the standardization of downlink control channels from base stations to relay stations (hereinafter referred to as "R-PDCCH") is under way (e.g., see NPL-4, NPL-5, NPL-6, NPL-7, and NPL-8). At present, the following matters are being studied in relation to the R-PDCCH. FIG. 3 illustrates an example of an R-PDCCH region.

(1) A mapping start position in the time-domain of an R-PDCCH is fixed at the fourth OFDM symbol from the beginning of a subframe, and thus does not depend on the rate at which a PDCCH occupies OFDM symbols in the time-domain.

(2) Each R-PDCCH occupies a resource composed of one or more consecutive Relay-Control Channel Elements (R-CCEs). The number of REs forming one R-CCE varies for each slot, or for each reference signal location. Specifically, in slot 0, an R-CCE is defined as a resource region having, in the time direction, a range of from the third OFDM symbol to the end of slot 0, and having, in the frequency direction, a range of 1 RB's width (excluding, however, the region onto which the reference signal is mapped). In addition, in slot 1, an R-CCE is defined as a resource region having, in the time direction, a range of from the beginning of slot 1 to the end of slot 1, and having, in the frequency direction, a range of 1 RB's width (excluding, however, the region onto which the reference signal is mapped). However, proposals have also been made to divide the above-mentioned resource region into two in slot 1, and to have each be one R-CCE.

Further, in LTE, when multiplexing a plurality of terminals for uplink, in order to match timings at which uplink signals transmitted from each of the plurality of terminals arrive at a base station, processing referred to as "Timing Advance" (TA) is performed. The following procedures are executed according to Timing Advance. Namely, a base station measures the timings of uplink signals transmitted from terminals. Based on the measurement results, the base station sends an instruction to specify the transmission timing to each terminal so that the timings at which signals transmitted from the terminals arrive at the base station match between the multiplexed terminals. Subsequently, each terminal transmits an uplink signal at the timing instructed by the base station.

CITATION LIST

Non-Patent Literature

NPL 1
3GPP TS 36.211 V9.1.0, "Physical Channels and Modulation (Release 9)," May 2010
NPL 2
3GPP TS 36.212 V9.2.0, "Multiplexing and channel coding (Release 9)," June 2010
NPL 3
3GPP TS 36.213 V9.2.0, "Physical layer procedures (Release 9)," June 2010
NPL 4
3GPP TSG RAN WG1 meeting, R1-092641, "PDCCH design for Carrier aggregation and Post Rel-8 features," June 2009
NPL 5
3GPP TSG RAN WG1 meeting, R1-102700, "Backhaul Control Channel Design in Downlink," May 2010
NPL 6
3GPP TSG RAN WG1 meeting, R1-102881, "R-PDCCH placement," May 2010
NPL 7
3GPP TSG RAN WG1 meeting, R1-103040, "R-PDCCH search space design," May 2010
NPL 8
3GPP TSG RAN WG1 meeting, R1-103062, "Supporting frequency diversity and frequency selective R-PDCCH transmissions," May 2010

SUMMARY OF INVENTION

Technical Problem

LTE-A has backward compatibility with LTE. Since it is anticipated that an area covered by the LTE-A system will be small at the initial stage at the commencement of the system in particular, it is anticipated that LTE-A terminals that support LTE-A will be LTE/LTE-A multimode terminals that can simultaneously support LTE.

Also, since the same processing is performed for decoding of data when a base station allocated a PDSCH region to a terminal using a PDCCH region and for decoding of data when a base station allocated an (R-)PDSCH region to a terminal using an R-PDCCH region, and the operations are not performed simultaneously, it is anticipated that the same decoding circuit will be shared.

As described above, a PDCCH can be allocated to a region from a first to a third OFDM symbol in slot 0. Also, in slot 0, an R-PDCCH can be allocated to a region from the fourth OFDM symbol to the end of slot 0. In addition, in slot 1, an R-PDCCH can be allocated to a region from the beginning of slot 1 to the end of slot 1. Thus, the PDCCH, the R-PDCCH in slot 0, and the R-PDCCH in slot 1 are disposed so as to be temporally offset.

Accordingly, a timing at which a terminal can start blind decoding of DCI directed to the terminal varies depending on whether the DCI directed to the terminal is allocated to the PDCCH region or is allocated to an R-PDCCH region. Specifically, compared to a case where DCI is allocated to the PDCCH region, a timing at which a terminal can start blind decoding is later by four OFDM symbols when DCI is allocated to the R-PDCCH region in slot 0, and is later by a further 7 OFDM symbols (=amount of one slot) when DCI is allocated to the R-PDCCH region in slot 1.

On the other hand, a timing at which preparation should be completed for ACK/NACK transmission in accordance with a result of error detection with respect to data transmitted with the resource indicated by DCI directed to the terminal is the same and does not depend on whether the DCI directed to the terminal is allocated to the PDCCH region or to an R-PDCCH region. Specifically, four subframes after the subframe in which the DCI directed to the terminal was allocated, it is necessary for the terminal to transmit an ACK/NACK signal in accordance with a result of error detection with respect to the data transmitted with the resource indicated by the DCI.

Accordingly, when the DCI directed to the terminal is allocated to an R-PDCCH region, the time that can be spent on R-PDCCH processing and (R-)PDSCH processing is less than when the DCI is allocated to the PDCCH region.

Consequently, it is necessary to adopt either of the following measures at the terminal.

(1) In this case, as shown in FIG. 4, decoding start timings for an (R-)PDSCH are caused to match in a case where the mapping region that the DCI directed to the terminal is mapped to is the PDCCH region and a case where the mapping region is an R-PDCCH region. Here, it is necessary for the terminal to performing blind decoding of an R-PDCCH region more quickly than blind decoding of the PDCCH region. There is thus the problem that the scale of the R-PDCCH processing circuit increases. In this connection, in FIG. 4, the processing timing when the DCI directed to the terminal is allocated to the PDCCH region is shown in the upper section, and the processing timing when the DCI directed to the terminal is allocated to an R-PDCCH region is shown in the lower section.

(2) In this case, as shown in FIG. 5, with respect to a case where the mapping region that the DCI directed to the terminal is mapped to is the PDCCH region and a case where the mapping region is an R-PDCCH region, the speeds of the blind decoding are caused to match and consequently the decoding start timing for the (R-)PDSCH is displaced. Here, it is necessary for the terminal to be designed in accordance with a smaller processing time margin of the (R-)PDSCH in a case where DCI directed to the terminal is allocated to an R-PDCCH. In this case, with an LTE/LTE-A multimode terminal, since operations in an over-engineered state are performed at a time of LTE operation, there is the problem that the scale of the processing circuit for the (R-)PDSCH increases. In this connection, in FIG. 5, the processing timing when the DCI directed to the terminal is allocated to the PDCCH region is shown in the upper section, and the processing timing when the DCI directed to the terminal is allocated to an R-PDCCH region is shown in the lower section.

These problems arise not only in a terminal that performs communications with a base station, but also in a relay station. In particular, these problems are noticeable in terminals with respect to which high levels of constraints are demanded in relation to circuit scale and power consumption.

In addition, a base station transmits downlink data to a terminal in a given subframe, and four subframes (4 ms) thereafter the base station receives an error detection result (ACK/NACK) with respect to the downlink data. PDCCH processing and PDSCH processing are always performed on the basis of an assumed "maximum propagation delay amount between the base station and terminal". As used herein, the term "maximum propagation delay amount between the base station and terminal" refers to a round-trip maximum propagation delay amount between a base station and a terminal. If a cell with a radius of 100 km is assumed, the "maximum propagation delay amount between the base station and the terminal" is $100\times10^3$ (m)$\div(3.0\times10^8$ (m/s))$\times 2$ (amount of one round trip)$\approx 0.66$ ins. In this case, the terminal performs PDCCH processing and PDSCH processing within $4-0.66\approx 3.3$ ms. However, if processing based on the assumed maximum propagation delay amount is similarly performed for R-PDCCH processing and (R-)PDSCH processing, the delay amount is combined with the delay in the decoding start timing of the R-PDCCH relative to the PDCCH, and therefore the time that can be spent on R-PDCCH processing and (R-)PDSCH processing decreases.

An object of the present invention is to provide a transmission apparatus and a transmission method that are capable of allowing leeway in data reception processing on a receiving side regardless of the time position of a resource region to which control information that includes resource allocation information for transmission data is mapped.

Solution to Problem

A transmission apparatus according to one aspect of the present invention includes: a configuration section that configures a mapping region in which control information is mapped, the control information including information about a resource region allocated to transmission data and data size information about a size of the transmission data, the configuration section configuring the mapping region for control information targeted for processing, in accordance with a data size indicated by the control information targeted for processing, from among first to $N^{th}$ (N being a natural number no less than 2) resource regions provided in sequential order in a time direction within a communication unit time; and a mapping control section that maps the control information targeted for processing to the configured mapping region and transmits the control information.

A transmission method according to one aspect of the present invention includes: configuring a mapping region in which control information is mapped, the control information including information about a resource region allocated to transmission data and data size information about a size of the transmission data, in which the mapping region for control information targeted for processing is configured in accordance with a data size indicated by the control information targeted for processing, from among first to $N^{th}$ (N being a natural number no less than 2) resource regions that are provided in sequential order in a time direction within a communication unit time; and mapping the control information targeted for processing to the configured mapping region and transmitting the control information.

A transmission apparatus according to one aspect of the present invention includes: a configuration section that configures a mapping region in which control information is mapped, the control information including information about a resource region allocated to transmission data and data size information about a size of the transmission data, the configuration section configuring the mapping region for control information targeted for processing, in accordance with a data size indicated by the control information targeted for processing, from among first to $N^{th}$ (N being a natural number no less than 2) resource regions provided in sequential order in a time direction within a communication unit time; and a mapping control section that maps the control information targeted for processing to the configured mapping region and transmits the control information; in which, among the first to $N^{th}$ resource regions, a maximum size value for the first resource region is configured in accordance with a maximum value of a timing advance value, a maximum size value for the second to $N^{th}$ (N being a natural number no less than 2) resource regions is configured in accordance with the timing advance value, and in order to cause reception timings of signals transmitted from a plurality of receiving apparatuses that receive the transmission data and the control information to match, the timing advance value is transmitted from the transmission apparatus to each of the plurality of receiving apparatuses.

A transmission method according to one aspect of the present invention includes: a step of configuring a mapping region in which control information is mapped, the control information including information about a resource region allocated to transmission data and data size information about a size of the transmission data, in which the mapping region for control information targeted for processing is configured in accordance with a data size indicated by the control information targeted for processing, from among first to $N^{th}$ (N being a natural number no less than 2) resource regions that are provided in sequential order in a time direction within a communication unit time; and a step of mapping the control information targeted for processing to the configured mapping region and transmitting the control information; in which, among the first to $N^{th}$ resource regions, a maximum size value for the first resource region is configured in accordance with a maximum value of a timing advance value, a maximum size value for the second to $N^{th}$ (N being a natural number no less than 2) resource regions is configured in accordance with the timing advance value, and in order to cause reception timings of signals transmitted from a plurality of receiving apparatuses that receive the transmission data and the control information to match, the timing advance value is transmitted to each of the plurality of receiving apparatuses from an apparatus that performs the transmission method.

Advantageous Effects of Invention

With the present invention, it is possible to provide a transmission apparatus and a transmission method that are capable of allowing leeway in data reception processing on a receiving side regardless of the time position of a resource region to which control information containing resource allocation information for transmission data is mapped.

BRIEF DESCRIPTION OF DRAWINGS

FIG. 9 is a diagram for explaining maximum size values for a PDCCH region, an R-PDCCH region in slot 0, or an R-PDCCH region in slot 1;
FIG. 15 is a diagram for explaining maximum size values for a PDCCH region, an R-PDCCH region in slot 0, or an R-PDCCH region in slot 1;
FIG. 20 is a diagram for explaining an example of disposing the number of blind decoding operations according to another embodiment of the present invention.

DESCRIPTION OF EMBODIMENTS

Figure 1:
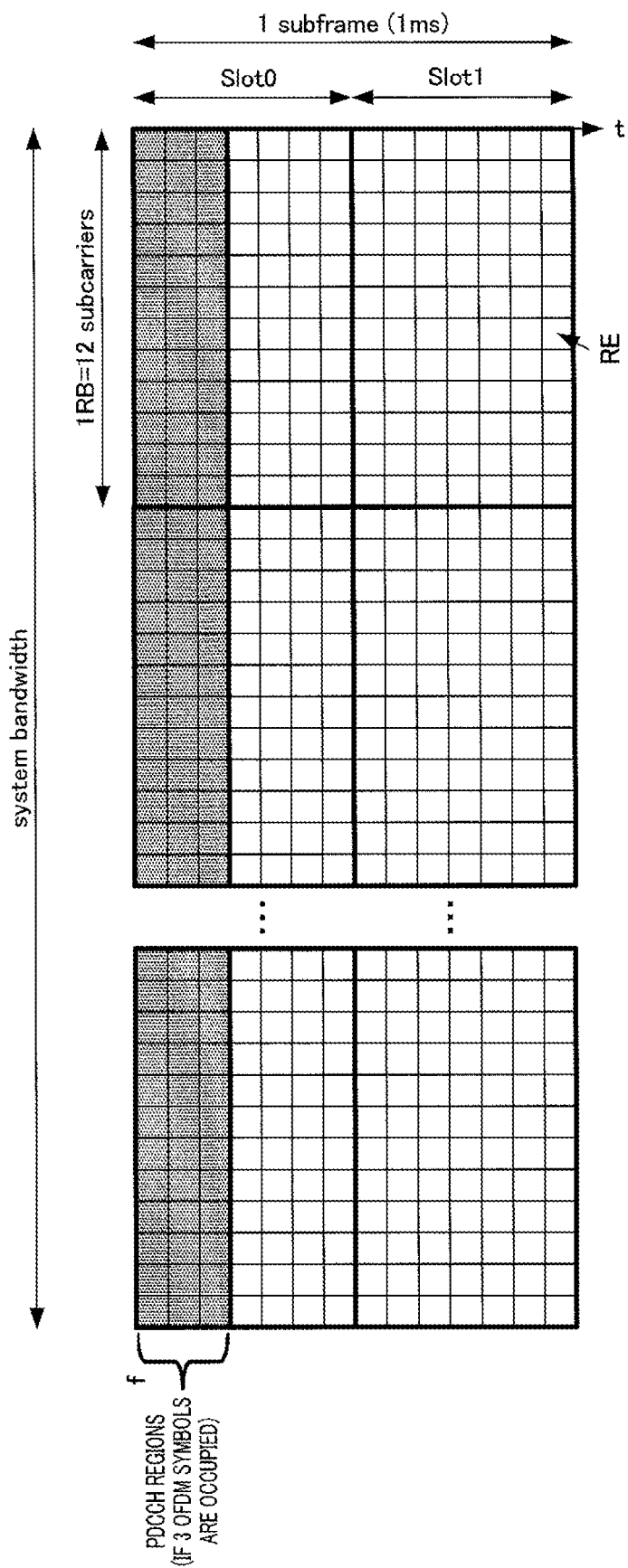
FIG. 1 illustrates an example of a PDCCH region.
Figure 2:
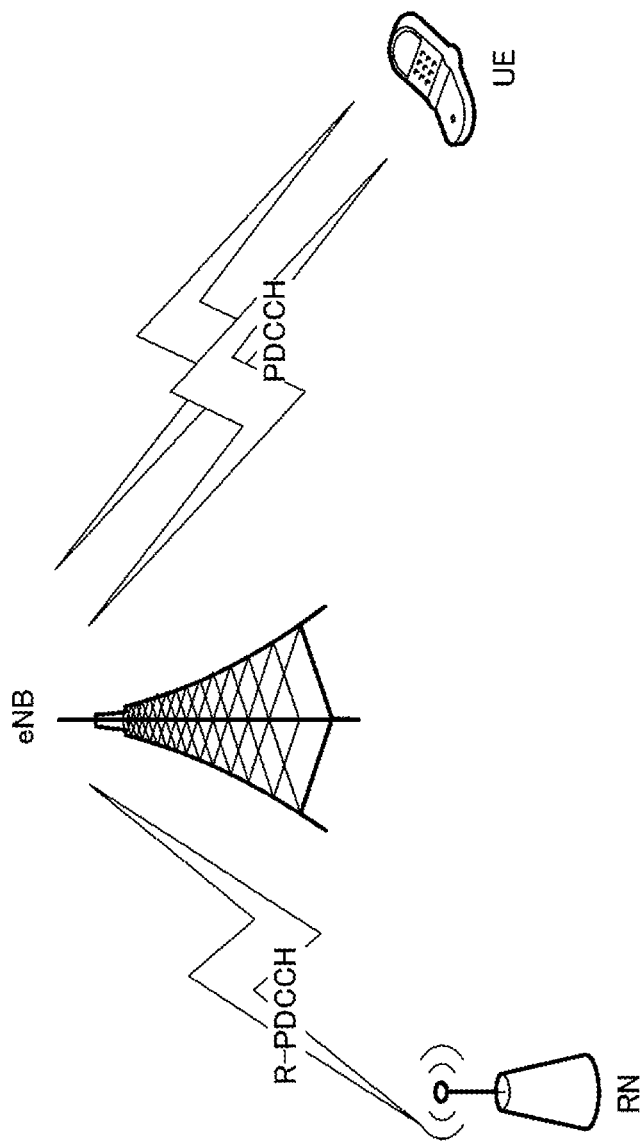
FIG. 2 is a diagram for explaining a communication system including a radio communication relay apparatus.

Embodiments of the present invention are described in detail below with reference to the accompanying drawings. In the embodiments, the same reference numerals are used for denoting the same components, and a redundant description thereof is omitted.

(Embodiment 1)
(Communication System Overview)

A communication system according to Embodiment 1 of the present invention includes base station 100 and terminal 200. Base station 100 is an LTE-A base station, and terminal 200 is an LTE-A terminal.

Figure 6:
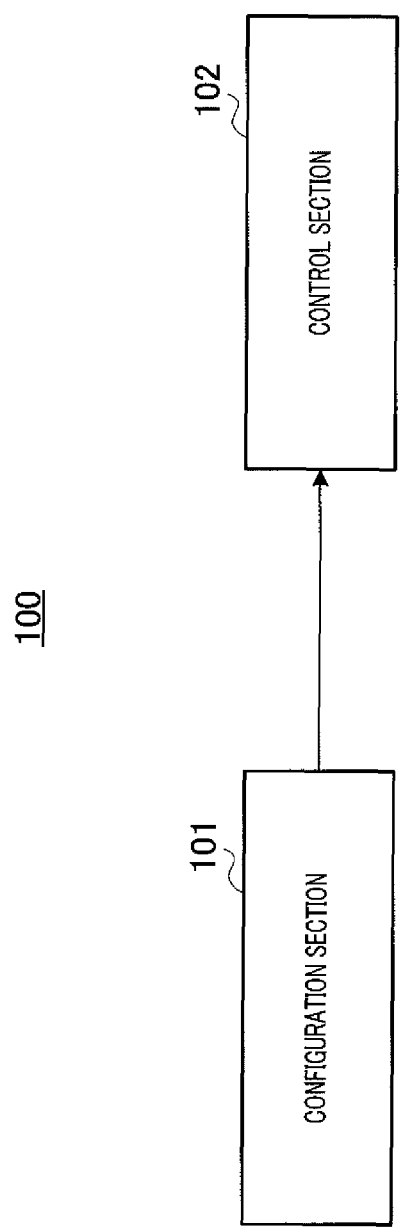
FIG. 6 is a principal block diagram of a base station according to Embodiment 1 of the present invention.

FIG. 6 is a principal block diagram of base station 100 according to Embodiment 1 of the present invention. In base station 100, configuration section 101 configures a mapping region in which control information is mapped, the control information including information about a resource region that is allocated to transmission data and data size information about a size of the transmission data, from among a first to an $N^{th}$ (N being a natural number no less than 2) resource regions that are provided in sequential order in a time direction within a communication unit time (for example, a subframe), in accordance with the data size indicated by the control information. Control section 102 performs control that maps the control information to the mapping region configured by configuration section 101.

Hereunder, an example is described of a case where, in particular, N=3, that is, a case where a PDCCH region, an R-PDCCH region in slot 0, and an R-PDCCH region in slot 1 exist as mapping region candidates.

(Configuration of Base Station 100)

Figure 7:
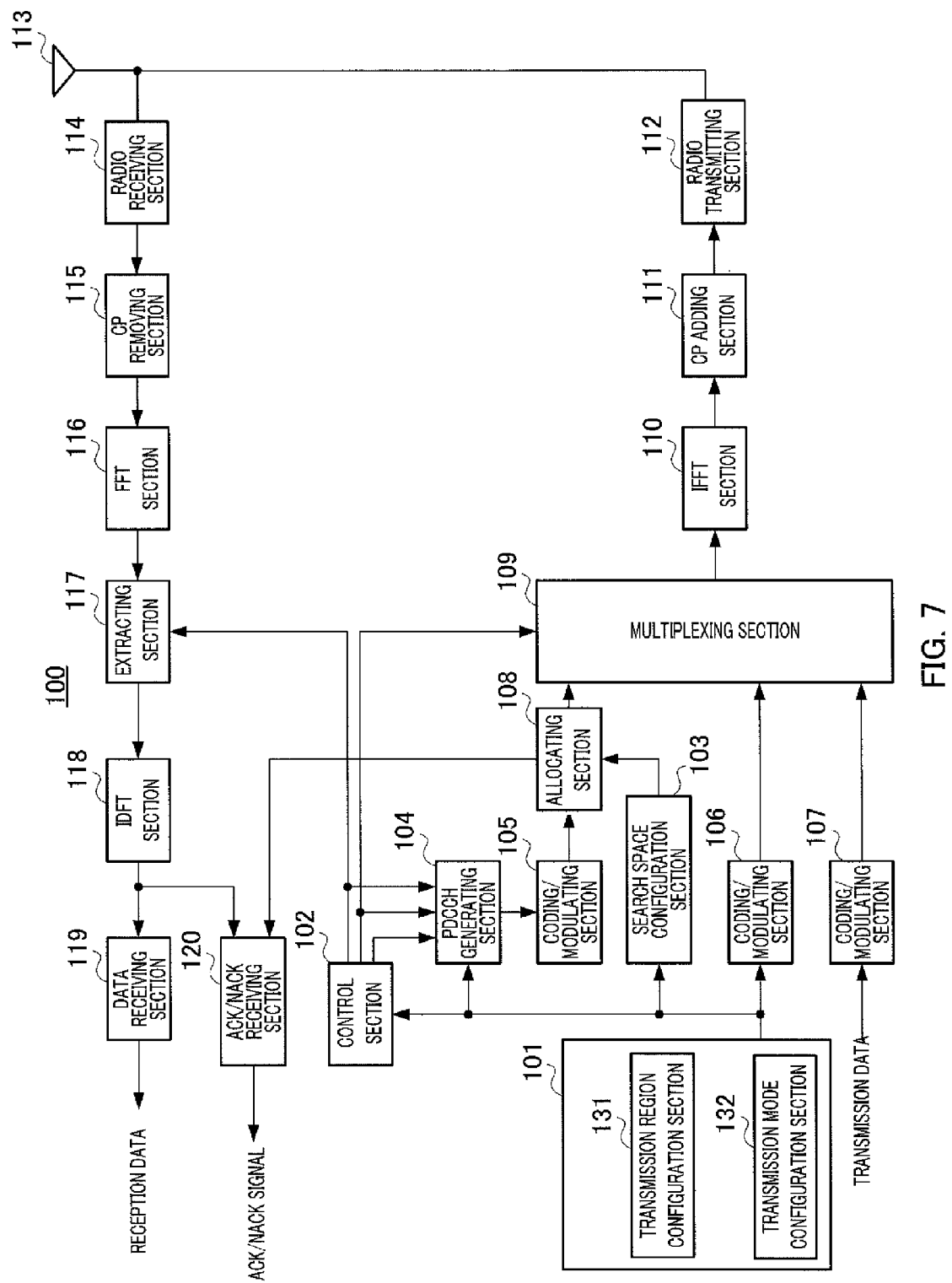
FIG. 7 is a block diagram illustrating the configuration of the base station according to Embodiment 1 of the present invention.

FIG. 7 is a block diagram illustrating a configuration of base station 100 according to Embodiment 1 of the present invention. In FIG. 7, base station 100 includes configuration section 101, control section 102, search space configuration section 103, PDCCH generating section 104, coding/modulating sections 105, 106 and 107, allocating section 108, multiplexing section 109, inverse fast Fourier transform (IFFT) section 110, cyclic prefix (CP) adding section 111, radio transmitting section 112, antenna 113, radio receiving section 114, CP removing section 115, fast Fourier transform (FFT) section 116, extracting section 117, inverse discrete Fourier transform (IDFT) section 118, data receiving section 119, and ACK/NACK receiving section 120.

Configuration section 101 configures a resource region for use in the transmission of DCI to terminal 200 and also configures each transmission mode for uplink and downlink for terminal 200. A resource region for use in the transmission of DCI to terminal 200 is configured in accordance with a downlink data size indicated by the DCI. Here, the downlink data size is defined as a transport block size. The configuration of a resource region and the configuration of a transmission mode are performed for each terminal 200 to be configured. Configuration information about a resource region and a transmission mode is sent to control section 102, search space configuration section 103, and coding/modulating section 106. Configuration information about a resource region is sent to control section 102.

Specifically, configuration section 101 includes transmission region configuration section 131 and transmission mode configuration section 132.

Transmission region configuration section 131 configures a resource region for use in the transmission of DCI to terminal 200 based on a downlink data size indicated by the DCI and a configuration rule table. Candidates for the resource regions to be configured include a PDCCH region, an R-PDCCH region in slot 0, and an R-PDCCH region in slot 1.

In the configuration rule table, first to third resource regions (that is, in this case, the PDCCH region, the R-PDCCH region in slot 0, and the R-PDCCH region in slot 1) and maximum size values of a downlink data size indicated by DCI that can be configured in each resource region are associated with each other. The maximum size values decrease in the order of the PDCCH region, the R-PDCCH region in slot 0, and the R-PDCCH region in slot 1. The configuration rule table is stored in a memory of configuration section 101.

For example, normally, a PDCCH region is configured for terminal 200, and a large number of terminals 200 communicate under the control of base station 100. Accordingly, if the allocation of a PDCCH region is expected to be tight or if it is determined that significant interference occurs in the PDCCH region, then an R-PDCCH region in slot 0 or an R-PDCCH region in slot 1 is configured for terminal 200. Information indicating whether the resource region for use in the transmission of DCI is a PDCCH region, an R-PDCCH region in slot 0, or an R-PDCCH region in slot 1 is sent to control section 102.

Transmission mode configuration section 132 configures the transmission mode (for example, spatial multiplexing MIMO transmission, beamforming transmission, or non-consecutive band allocation) of each of uplink and downlink for terminal 200.

Configuration information about a resource region and a transmission mode is reported to each terminal 200 via coding/modulating section 106 as upper-layer control information (RRC control information or RRC signaling).

Control section 102 generates allocation control information including MCS information, resource (i.e., RB) allocation information, and a new data indicator (NDI) based on configuration information about a resource region that is inputted from configuration section 101. As the resource allocation information, control section 102 generates uplink resource allocation information indicating an uplink resource (for example, a Physical Uplink Shared Channel (PUSCH)) to which uplink data from terminal 200 is allocated, or downlink resource allocation information indicating a downlink resource (for example, a Physical Downlink Shared Channel (PDSCH)) to which downlink data to terminal 200 is allocated.

Furthermore, on the basis of configuration information received from configuration section 101, control section 102 generates, for each terminal 200, allocation control information (any one of DCI 0A and DCI 0B) based on a transmission mode of the uplink for terminal 200, allocation control information (any one of DCI 1, DCI 1B, DCI 1D, DCI 2, and DCI 2A) based on a transmission mode of the downlink, or allocation control information (DCI 0/1A) common to all the terminals.

For example, in order to improve throughput during normal data transmission, control section 102 generates allocation control information (any one of DCI 1, DCI 1B, DCI 1D, DCI 2, DCI 2A, DCI 0A, and DCI 0B) corresponding to the transmission mode of each terminal 200 so as to allow data transmission in the transmission mode configured for each terminal 200. As a result, data can be transmitted in the transmission mode configured for each terminal 200, which improves throughput.

However, an abrupt change in the condition of a propagation path or a change in interference from an adjacent cell may cause frequent errors in receiving data with the transmission mode configured for each terminal 200. In this case, control section 102 generates allocation control information in the format (DCI 0/1A) common to all the terminals and transmits data in a robust default transmission mode. As a result, robust data transmission is allowed even if a propagation environment is abruptly changed.

Also, when upper-layer control information (i.e., RRC signaling) is transmitted for the notification of a transmission mode change under deteriorated conditions of a propagation path, control section 102 generates allocation control information (i.e., DCI 0/1A) common to all the terminals and transmits the information using the default transmission mode. The number of information bits of DCI 0/1A common to all the terminals is smaller than those of DCI 1, DCI 2, DCI 2A, DCI 0A, and DCI 0B which are dependent on the transmission mode. For this reason, if the same number of CCEs is set, DCI 0/1A can allow transmission at a lower coding rate than that related to DCI 1, DCI 2, DCI 2A, DCI 0A, and DCI 0B. Thus, use of DCI 0/1A in control section 102 under a deteriorated condition of a propagation path enables a terminal having a poor condition of a propagation path to receive allocation control information (and data) with a low error rate.

Control section 102 also generates allocation control information for a shared channel (for example, DCI 1C and 1A) for the allocation of data common to a plurality of terminals, such as broadcast information and paging information, in addition to the allocation control information for the allocation of terminal-specific data.

From among the generated allocation control information for the allocation of terminal-specific data, control section 102 outputs MCS information and an NDI to PDCCH generating section 104, uplink resource allocation information to PDCCH generating section 104 and extracting section 117, and downlink resource allocation information to PDCCH generating section 104 and multiplexing section 109. Mapping to the mapping region of DCI is controlled by the downlink resource allocation information being passed to multiplexing section 109. Control section 102 also outputs the generated allocation control information for a shared channel to PDCCH generating section 104.

Search space configuration section 103 configures a search space based on the search space configuration rule associated with the configured resource region indicated by configuration information received from configuration section 101. Each search space configuration rule is stored as a table in memory included in search space configuration section 103. A search space includes a common search space (C-SS) and a unique search space (UE-SS) as described above. The common search space (C-SS) is a search space common to all the terminals, and the unique search space (UE-SS) is a search space specific to each terminal as described above.

PDCCH generating section 104 generates DCI including allocation control information received from control section 102 for the allocation of terminal-specific data (i.e., uplink resource allocation information, downlink resource allocation information, MCS information, an NDI, and/or the like for each terminal) or DCI including allocation control information for a shared channel (i.e., broadcast information, paging information, and other information common to terminals). In so doing, PDCCH generating section 104 adds CRC bits to the uplink allocation control information and the downlink allocation control information generated for each terminal and masks (or scrambles) the CRC bits with a terminal ID. PDCCH generating section 104 then outputs the masked signals to coding/modulating section 105.

Coding/modulating section 105 modulates the DCI received from PDCCH generating section 104 after channel coding and outputs the modulated signals to allocating section 108. Coding/modulating section 105 determines a coding rate set on the basis of channel quality indicator (CQI) information reported from each terminal so as to achieve a sufficient reception quality in each terminal. For example, as a distance between a terminal and a cell boundary decreases (i.e., as the channel quality of a terminal deteriorates), the coding rate to be set by coding/modulating section 105 decreases.

Allocating section 108 receives, from coding/modulating section 105, DCI including allocation control information for a shared channel and DCI including allocation control information for the allocation of terminal-specific data to each terminal. Then, allocating section 108 allocates the received DCI to each of CCEs or R-CCEs in a C-SS, or CCEs or R-CCEs in a UE-SS for each terminal in accordance with search space information received from search space configuration section 103.

For example, allocating section 108 selects one DCI allocation region candidate from a group of DCI allocation region candidates in a C-SS. Allocating section 108 then allocates DCI including allocation control information for a shared channel to a CCE (or an R-CCE; hereinafter, sometimes simply referred to as "CCE" without distinguishing "CCE" from "R-CCE") in the selected DCI allocation region candidate.

In the case of a DCI format specific to the terminal (for example, DCI 1, DCI 1B, DCI 1D, DCI 2, DCI 2A, DCI 0A, or DCI 0B), allocating section 108 allocates a CCE in a UE-SS configured for the terminal to the DCI. On the other hand, if the DCI format intended for the terminal is a DCI format common to all the terminals (for example, DCI 0/1A), allocating section 108 allocates a CCE in a C-SS or a CCE in a UE-SS configured for the terminal to the DCI.

The CCE aggregation level to be allocated to one DCI item depends on the coding rate and the number of DCI bits (namely, the amount of allocation control information). For example, because the coding rate of DCI intended for a terminal located around a cell boundary is set low, more physical resources are required. Accordingly, allocating section 108 allocates more CCEs to DCI for a terminal located around a cell boundary.

Allocating section 108 then outputs information about the CCEs allocated to the DCI to multiplexing section 109 and ACK/NACK receiving section 120. Allocating section 108 outputs the coded/modulated DCI to multiplexing section 109.

Coding/modulating section 106 modulates the configuration information received from configuration section 101 after channel coding and outputs the modulated configuration information to multiplexing section 109.

Coding/modulating section 107 modulates the input transmission data (downlink data) after channel coding and outputs the modulated transmission data signals to multiplexing section 109.

Multiplexing section 109 multiplexes the coded/modulated DCI signal received from allocating section 108, the configuration information received from coding/modulating section 106, and the data signals (namely, PDSCH signals) input from coding/modulating section 107 in the time domain and the frequency domain. Multiplexing section 109 maps the PDCCH signals and the data signals (PDSCH signals) on the basis of the downlink resource allocation information received from control section 102. Multiplexing section 109 may also map the configuration information onto the PDSCH. Multiplexing section 109 then outputs the multiplexed signals to IFFT section 110.

IFFT section 110 converts the multiplexed signals from multiplexing section 109 for each antenna into a time waveform. CP adding section 111 adds a CP to the time waveform to obtain OFDM signals.

Radio transmitting section 112 performs radio processing for transmission (for example, up-conversion or digital-analog (D/A) conversion) on the OFDM signals input from CP adding section 111 and transmits the resultant signals via antenna 113.

Radio receiving section 114 performs radio processing for reception (for example, down-conversion or analog-digital (A/D) conversion) on radio signals received via antenna 113 at a receiving band and outputs the resultant received signals to CP removing section 115.

CP removing section 115 removes the CP from the received signals and fast Fourier transform (FFT) section 116 converts the received signals from which the CP is removed into frequency domain signals.

Extracting section 117 extracts uplink data from the frequency domain signals received from FFT section 116 on the basis of uplink resource allocation information received from control section 102. IDFT section 118 converts the extracted signals into time domain signals and outputs the time domain signals to data receiving section 119 and ACK/NACK receiving section 120.

Data receiving section 119 decodes the time domain signals input from IDFT section 118. Data receiving section 119 then outputs decoded uplink data as received data.

ACK/NACK receiving section 120 extracts, from the time domain signals received from IDFT section 118, ACK/NACK signals from each terminal for the downlink data (PDSCH signals). Specifically, ACK/NACK receiving section 120 extracts the ACK/NACK signals from an uplink control channel (e.g., a Physical Uplink Control Channel (PUCCH)) on the basis of the information received from allocating section 108. The uplink control channel is associated with the CCEs used for the transmission of the downlink allocation control information corresponding to the downlink data.

ACK/NACK receiving section 120 then determines the ACK or NACK of the extracted ACK/NACK signals.

One reason that the CCEs and the PUCCH are associated with each other is to obviate the need for signaling sent by the base station to notify each terminal of a PUCCH for use in transmitting ACK/NACK signals from the terminal, which thereby allows downlink communication resources to be used efficiently. Consequently, in accordance with this association, each terminal determines a PUCCH for use in transmitting ACK/NACK signals on the basis of the CCEs to which downlink allocation control information (DCI) for the terminal is mapped.

(Configuration of Terminal 200)

Figure 8:
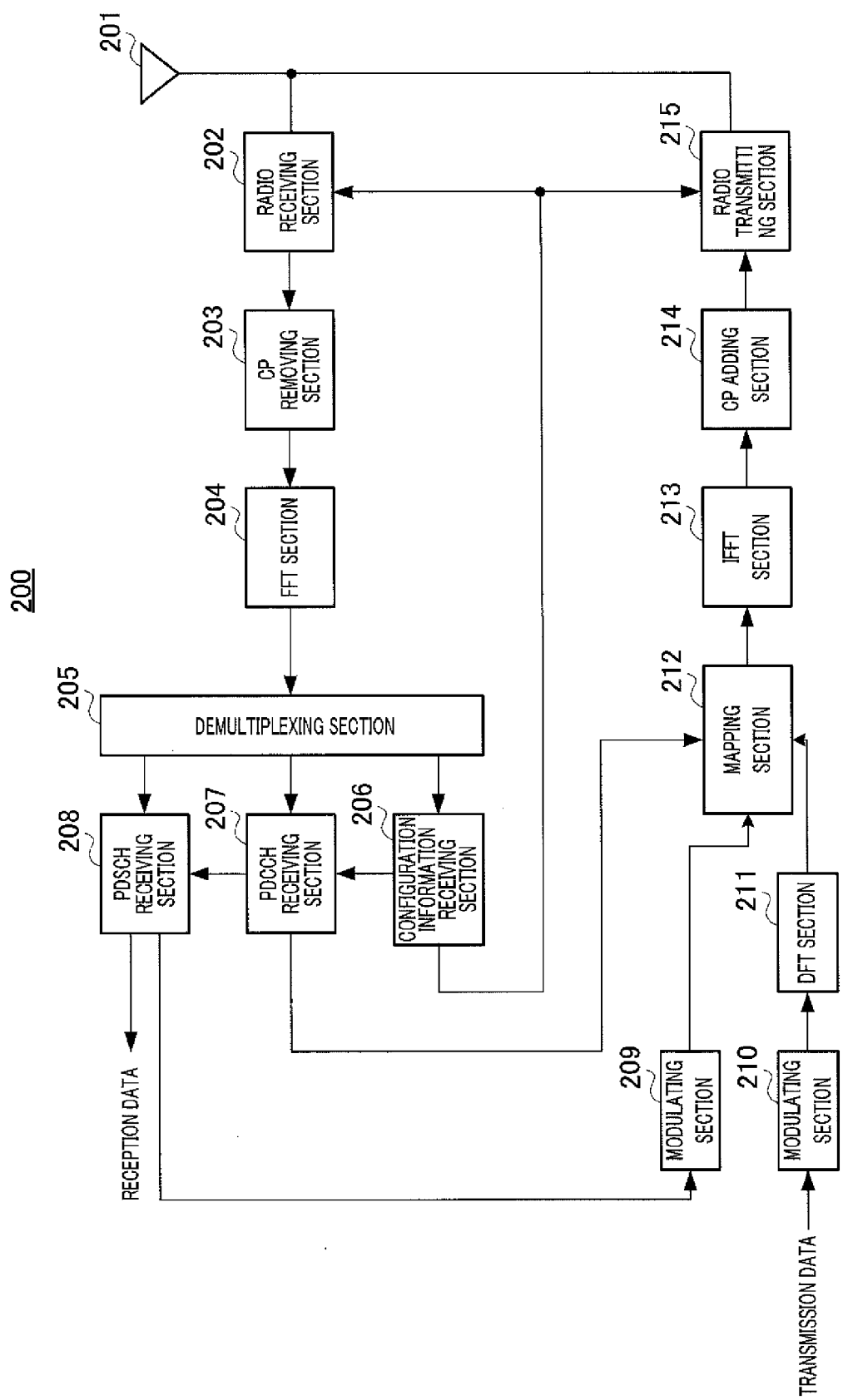
FIG. 8 is a block diagram illustrating the configuration of a terminal according to Embodiment 1 of the present invention.

FIG. 8 is a block diagram illustrating the configuration of terminal 200 according to Embodiment 1 of the present invention. In this case, terminal 200 is an LTE-A terminal.

In FIG. 8, terminal 200 includes antenna 201, radio receiving section 202, CP removing section 203, FFT section 204, demultiplexing section 205, configuration information receiving section 206, PDCCH receiving section 207, PDCCH receiving section 208, modulating sections 209 and 210, DFT section 211, mapping section 212, IFFT section 213, CP adding section 214, and radio transmitting section 215.

Radio receiving section 202 sets a reception band on the basis of band information received from configuration information receiving section 206. Radio receiving section 202 performs radio processing for reception (e.g., down-conversion or analog-digital (A/D) conversion) on radio signals (OFDM signals in this case) received via antenna 201 in the reception band and outputs the resultant received signals to CP removing section 203. The received signals may include a PDSCH DCI, and upper layer control information including configuration information. The DCI (allocation control information) is allocated to a common search space (C-SS) configured for terminal 200 and other terminals or to a unique search space (UE-SS) configured for terminal 200.

CP removing section 203 removes a CP from the received signals and FFT section 204 converts the received signals from which the CP is removed into frequency domain signals. The frequency domain signals are output to demultiplexing section 205.

Demultiplexing section 205 outputs to PDCCH receiving section 207, from signals received from FFT section 204, a component that may include DCI (i.e., signals extracted from a PDCCH region and an R-PDCCH region). Demultiplexing section 205 also outputs upper layer control signals (e.g., RRC signaling) including configuration information to configuration information receiving section 206 and data signals (i.e., PDSCH signals) to PDSCH receiving section 208. If the upper layer control signals including the configuration information are transmitted through a PDSCH, demultiplexing section 205 extracts the configuration information from the signals received by PDSCH receiving section 208.

Configuration information receiving section 206 reads the following information from the upper layer control signals received from demultiplexing section 205. That is, the information to be read includes: information indicating a terminal ID set for the terminal, information indicating a resource region configured for the terminal for use in transmitting DCI, information indicating a reference signal set for the terminal, and information indicating a transmission mode configured for the terminal.

The information indicating a terminal ID set for the terminal is output to PDCCH receiving section 207 as terminal ID information. The information indicating a resource region for use in transmitting DCI is output to PDCCH receiving section 207 as search space region information. The information indicating a reference signal set for the terminal is output to PDCCH receiving section 207 as reference signal information. The information indicating a transmission mode configured for the terminal is output to PDCCH receiving section 207 as transmission mode information.

PDCCH receiving section 207 blind-decodes (monitors) the signals input from demultiplexing section 205 to obtain DCI for the terminal. The blind decoding is performed on unit region candidates targeted for decoding that are specified in search space configuration rules. Each search space configuration rule is saved as a table in memory included in PDCCH receiving section 207. PDCCH receiving section 207 performs blind-decoding for a DCI format for the allocation of data common to all the terminals (for example, DCI 0/1A), a DCI format dependent on the transmission mode configured for the terminal (for example, DCI 1, DCI 2, DCI 2A, DCI 0A, and DCI 0B), and a DCI format for the allocation of a shared channel common to all the terminals (for example, DCI 1C and DCI 1A). This operation creates DCI including allocation control information on the DCI formats.

If a region indicated by search space region information received from configuration information receiving section 206 is a PDCCH region, PDCCH receiving section 207 performs, with respect to a C-SS, blind-decoding for the DCI formats for shared channel allocation (DCI 1C and DCI 1A) and the DCI format for the allocation of data common to all the terminals (DCI 0/1A) on the basis of the search space configuration rule. Specifically, for each unit region candidate targeted for decoding in a C-SS (i.e., candidates of a CCE region allocated to terminal 200), PDCCH receiving section 207 performs demodulation and decoding based on the size of the DCI format for shared channel allocation and the size of the DCI format for the allocation of data common to all the terminals. For the decoded signals, PDCCH receiving section 207 demasks CRC bits with an ID common to a plurality of terminals. PDCCH receiving section 207 then determines signals for which "CRC=OK" (i.e. no error) is returned as a result of the demasking to be DCI including allocation control information for a shared channel. For the decoded signals, PDCCH receiving section 207 further demasks the CRC bits with the terminal ID of the terminal indicated by the terminal ID information. PDCCH receiving section 207 then determines signals for which "CRC=OK" (i.e. no error) is returned as a result of the demasking to be DCI including allocation control information for the terminal. In other words, in a C-SS, PDCCH receiving section 207 determines by means of a terminal ID (i.e., an ID common to a plurality of terminals or the terminal ID of terminal 200) whether allocation control information of DCI 0/1A is for a shared channel or for the allocation of data to the terminal.

PDCCH receiving section 207 calculates a UE-SS for the terminal for each CCE aggregation level with the terminal ID indicated by the terminal TD information received from configuration information receiving section 206. For each blind decoding region candidate in the obtained UE-SS, PDCCH receiving section 207 then performs demodulation and decoding based on the size of the DCI format corresponding to the transmission mode configured for the terminal (the transmission mode indicated by the transmission mode information) and the size of the DCI format common to all the terminals (DCI 0/1A). For the decoded signals, PDCCH receiving section 207 demasks CRC bits with the terminal ID of the terminal. PDCCH receiving section 207 determines signals for which "CRC=OK" (i.e. no error) is returned as a result of demasking to be DCT for the terminal.

Even if the region indicated by the search space region information received from configuration information receiving section 206 is an R-PDCCH region in slot 0 or an R-PDCCH region in slot 1, PDCCH receiving section 207 also performs blind decoding on the basis of the search space configuration rule. If no search space region information (i.e., search space allocation) is received from configuration information receiving section 206 (i.e., if base station 100 transmits no search space region information), terminal 200 may perform blind decoding without considering the allocation of search spaces.

Upon reception of downlink allocation control information, PDCCH receiving section 207 outputs downlink resource allocation information in the DCI for the terminal to PDSCH receiving section 208. Upon reception of uplink allocation control information, PDCCH receiving section 207 outputs uplink resource allocation information to mapping section 212. PDCCH receiving section 207 also outputs the CCE number (CCE number for the leading CCE if the CCE aggregation level is plural) for the CCE used for the transmission of the DCI for the terminal (i.e., CCE used for the transmission of the signals for which "CRC=OK") to mapping section 212. The details of blind decoding (monitoring) in the PDCCH receiving section will be described hereinafter.

PDSCH receiving section 208 decodes the PDSCH signals received from demultiplexing section 205 on the basis of the downlink resource allocation information received from PDCCH receiving section 207 to obtain the received data (i.e., downlink data). That is, PDSCH receiving section 208 has a decoding circuit. PDSCH receiving section 208 also detects any error in the received data (i.e., downlink data). If an error is found in the received data as a result of the error detection, PDSCH receiving section 208 generates NACK signals as ACK/NACK signals. If no error is found in the received data, PDSCH receiving section 208 generates ACK signals as ACK/NACK signals. The ACK/NACK signals are output to modulating section 209.

Modulating section 209 modulates the ACK/NACK signals received from PDSCH receiving section 208 and outputs the modulated ACK/NACK signals to mapping section 212.

Modulating section 210 modulates transmission data (i.e., uplink data) and outputs the modulated data signal to DFT section 211.

DFT section 211 converts the data signals received from modulating section 210 into the frequency domain and outputs a plurality of resultant frequency components to mapping section 212.

Mapping section 212 maps the frequency components received from DFT section 211 to a PUSCH included in the uplink unit carrier in accordance with the uplink resource allocation information received from PDCCH receiving section 207. Mapping section 212 also identifies a PUCCH in accordance with the CCE number received from PDCCH receiving section 207. Mapping section 212 then maps the ACK/NACK signals input from modulating section 209 to the identified PDCCH.

IFFT section 213 converts the plurality of frequency components mapped to the PUSCH into a time domain waveform. CP adding section 214 adds a CP to the time domain waveform.

Radio transmitting section 215 can vary the transmission band. Radio transmitting section 215 determines a specific transmission band on the basis of the band information received from configuration information receiving section 206. Radio transmitting section 215 then performs transmission radio processing (for example, up-conversion or digital-analog (D/A) conversion) on the CP-added signals and transmits the resultant signals via antenna 201.

(Operations of Base Station 100 and Terminal 200)

Operations of base station 100 and terminal 200 having the above described configurations will now be described.

In base station 100, in accordance with a downlink data size indicated by DCI, configuration section 101 configures a mapping region to which the DCI is to be mapped, from among a PDCCH region, an R-PDCCH region in slot 0, and an R-PDCCH region in slot 1 that are provided in sequential order in the time direction within a subframe.

A configuration rule table is used for this configuration of a mapping region. In the configuration table, the PDCCH region, the R-PDCCH region in slot 0, and the R-PDCCH region in slot 1 are associated with maximum size values of the downlink data size indicated by the DCI that can be configured in each resource region. Here, a downlink data size is defined as a transport block size. The maximum size value decreases in the order of the PDCCH region, the R-PDCCH region in slot 0, and the R-PDCCH region in slot 1.

As described above, when DCI is mapped to the PDCCH region, the R-PDCCH region in slot 0, or the R-PDCCH region in slot 1, a time that can be spent on R-PDCCH processing and (R-)PDSCH processing decreases in this order of the regions. Therefore, by decreasing maximum size values in this order, terminal 200 that is the receiving side for the DCI and downlink data can satisfy a requirement with respect to the predetermined ACK/NACK transmission timing even when performing processing at a processing speed equivalent to that of PDCCH processing and PDSCH processing in an LTE terminal.

In terminal 200, PDSCH receiving section 208 that has a decoding circuit decodes PDSCH signals received from demultiplexing section 205 based on the downlink resource allocation information received from PDCCH receiving section 207 to obtain the received data (downlink data). PDSCH receiving section 208 also detects any error in the received data (i.e., downlink data). If an error is found in the received data as a result of the error detection, PDSCH receiving section 208 generates NACK signals as ACK/NACK signals. If no error is found in the received data, PDSCH receiving section 208 generates ACK signals as ACK/NACK signals.

In this case, a maximum value that may be set as a maximum size value can be calculated in the manner described below.

The times that can be spent on (R-)PDCCH decoding, (R-)PDSCH decoding, and ACK/NACK transmission preparation processing when DCI directed to the terminal is allocated to (1) a PDCCH region, (2) an R-PDCCH region in slot 0, and (3) an R-PDCCH region in slot 1 are as follows:

(1) when DCI is allocated to the PDCCH region:
11(OFDM symbol)/14(OFDM symbol)+3≈3.8 ms (2) when DCI is allocated to the R-PDCCH region in slot 0:
7(OFDM symbol)/14(OFDM symbol)+3=3.5 ms (that is, a time that is shorter by 4/14 ins compared to when DCI is allocated to the PDCCH region)

(3) when DCI is allocated to the R-PDCCH region in slot 1:
3.0 ms (that is, a time that is shorter by 11/14 ms compared when DCI is allocated to the PDCCH region).

On the other hand, the maximum operation time of a turbo decoder that is considered to be a processing bottleneck is 1.0 ms with respect to the maximum transport block size (=75376) that can be allocated to the PDCCH region. The reason for this is that when data is continuously transmitted with the maximum transport block size, if the required processing time exceeds one subframe length (1.0 ms), the decoding operations cannot keep pace with the amount of transmitted data. In a turbo decoder, parallel processing or the like is performed to shorten the operation time so that the maximum operation time of the turbo decoder becomes less than or equal to one subframe length (=1.0 ms). Note that, although it is assumed that the maximum operation time of the turbo decoder becomes less than or equal to 1.0 ms, this situation is not limited to a turbo decoder, and the intention herein is that the maximum operation time of processing that requires the most time in (R-)PDSCH decoding becomes less than or equal to 1.0 ms. In the description hereinafter, it is assumed that the processing that requires the most time is that of a turbo decoder.

Therefore, the maximum value that a transport block size may assume when DCI is allocated to an R-PDCCH region in slot 0 is 75376×(1−4/14)=53840 (i.e., it is sufficient if the maximum size value is less than or equal to that value). Further, the maximum value that a transport block size may assume when DCI is allocated to an R-PDCCH region in slot 1 is 75376×(1−11/14)=16152 (i.e., it is sufficient if the maximum size value is less than or equal to that value).

In practice, it is sufficient if the operation time of a turbo decoder is less than or equal to 1.0 ins. Accordingly, if the maximum transport block size when DCI is allocated to the PDCCH region is taken as 75376, the maximum transport block size when DCI is allocated to the R-PDCCH region in slot 0 is less than or equal to 53840. Further, the maximum transport block size when DCI is allocated to the R-PDCCH region in slot 1 is less than or equal to 16152.

That is, in a table shown in FIG. 9 in which transport block sizes are associated with pairs composed of a transport size index (I_TBS) and a number of allocated resource blocks (N_PRB), the transport block sizes are divided into three groups. In the table in FIG. 9, transport blocks indicated by DCI that is not mapped to the R-PDCCH region in slot 0 or the R-PDCCH region in slot 1 and is mapped only to the PDCCH region are specified in region 1. Transport blocks indicated by DCI that is not mapped to the R-PDCCH region in slot 1 and is mapped only to the R-PDCCH region in slot 0 or the PDCCH region are specified in region 2. Further, transport blocks indicated by DCI that is mapped to the R-PDCCH region in slot 0, the R-PDCCH region in slot 1 and the PDCCH region are specified in region 3.

The transport block sizes are described above as being divided into three groups. However, the transport block sizes can also be divided into two groups by making the maximum transport block size when DCI is allocated to the R-PDCCH region in slot 0 match the maximum transport block size when DCI is allocated to the R-PDCCH region in slot 1 and taking these together as one group. That is, in FIG. 9, transport blocks indicated by DCI that is not mapped to the R-PDCCH region in slot 0 or the R-PDCCH region in slot 1 and is mapped only to the PDCCH region is specified in region 1 and region 2. Furthermore, transport blocks indicated by DCI that is mapped to the R-PDCCH region in slot 0, the R-PDCCH region in slot 1 and the PDCCH region are specified in region 3.

In addition, in a case where DCI (DL assignment) is specified as not being allocated to the R-PDCCH region in slot 1 also, the transport block sizes can be divided into two groups. That is, in this case, in FIG. 9, transport blocks indicated by DCI that is not mapped to the R-PDCCH region in slot 0 and is mapped only to the PDCCH region are specified in region 1. Further, transport blocks indicated by DCI that is mapped to the R-PDCCH region in slot 0 and the PDCCH region are specified in region 2 and region 3.

As described above, according to the present embodiment, in base station 100, in accordance with a downlink data size indicated by DCI, configuration section 101 configures a mapping region to which the DCI is to be mapped, from among a PDCCH region, an R-PDCCH region in slot 0, and an R-PDCCH region in slot 1 that are provided in sequential order in the time direction within a subframe.

It is thereby possible to allow leeway in data reception processing on the receiving side (terminal 200) regardless of a time position of a mapping region to which DCI is mapped. Specifically, operations in an over-engineered state can be avoided when performing data reception processing during LTE operations, while securing a larger processing time margin for an R-PDCCH on the receiving side (terminal 200).

In a configuration rule table that is used for configuring the mapping regions, a PDCCH region, an R-PDCCH region in slot 0, and an R-PDCCH region in slot 1, and maximum size values of a downlink data size indicated by DCI that can be configured in each resource region are associated with each other. Here, a downlink data size is defined as a transport block size. Further, maximum size values decrease in the order of the PDCCH region, the R-PDCCH region in slot 0, and the R-PDCCH region in slot 1.

In the foregoing, a case is described in which DCI (=DL assignment) is allocated to a PDCCH region, an R-PDCCH region in slot 0, and an R-PDCCH region in slot 1. However, the present invention is not limited thereto. For example, it may be specified that a DL assignment is not allocated to the R-PDCCH region in slot 1. In this case, it is sufficient to decrease the maximum size values in the order of the PDCCH region and the R-PDCCH region in slot 0 in accordance with the amount of decrease in the time that can be spent on R-PDCCH processing and (R-)PDSCH processing (slot 0 only). That is, the above described method of configuring a mapping region is effective when a DL assignment can be allocated to two or more regions among a PDCCH region, an R-PDCCH region in slot 0, and an R-PDCCH region in slot 1.

In essence, it is sufficient that, in accordance with a downlink data size indicated by DCI targeted for processing, configuration section 101 in base station 100 configures a mapping region to which the DCI targeted for processing is mapped, from among a first to an $N^{th}$ (N being a natural number no less than 2) resource regions that are provided in sequential order in the time direction within a communication unit time (for example, a subframe).

Figure 10:
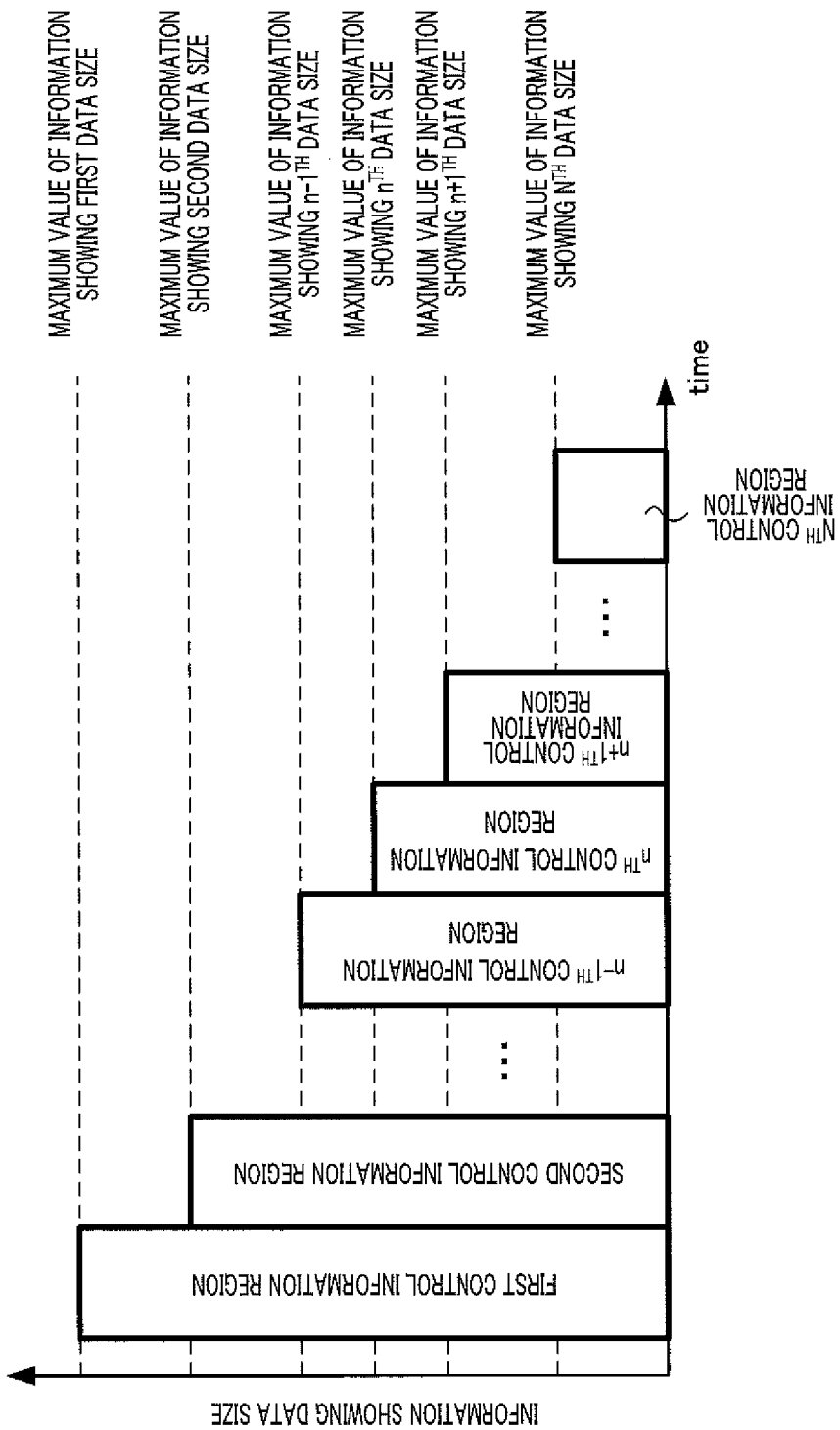
FIG. 10 is a diagram for explaining a configuration rule table.

In addition, although the above description relates to allocation control information (DCI) including information about a resource region to which downlink data is allocated and data size information about a size of the downlink data, the present invention is not limited thereto and can also be applied to uplink control information. In essence, it is sufficient that, in accordance with a data size indicated by control information targeted for processing, a mapping region to which the control information targeted for processing is mapped is configured from among a first to an $N^{th}$ (N being a natural number no less than 2) resource regions that are provided in sequential order in the time direction within a communication unit time. In this case, it is sufficient that in a configuration rule table that is used for configuring a mapping region, as shown in FIG. 10, the first to $N^{th}$ resource regions and maximum size values of downlink data sizes indicated by the allocation control information that can be configured in each resource region are associated with each other, and a maximum size value for an $n^{th}$ resource region (n being a natural number between 2 and N, inclusive) among the first to $N^{th}$ resource regions is smaller than a maximum size value for an $n-1^{th}$ resource region.

Figure 11:
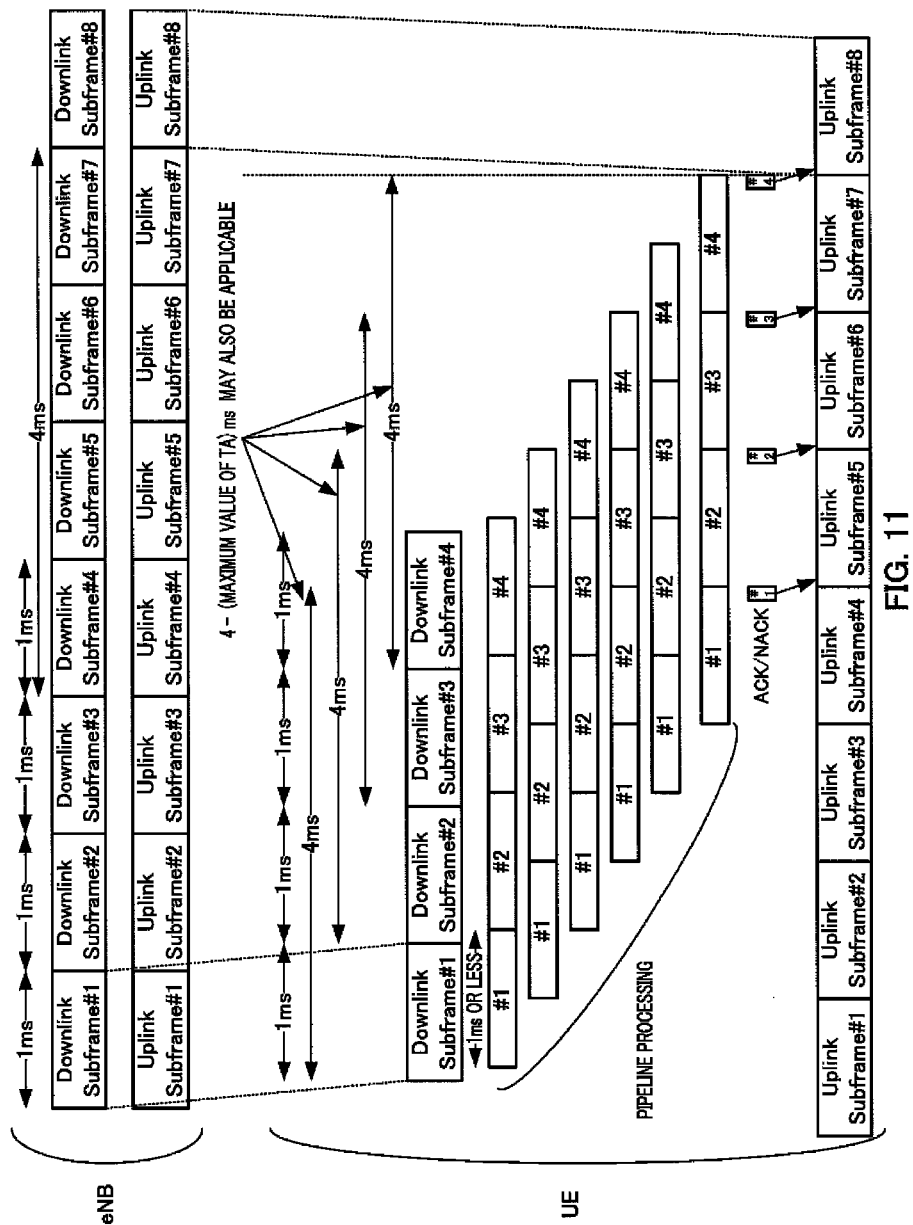
FIG. 11 is a diagram illustrating pipeline processing in a case where a terminal is notified of a DL assignment by means of a PDCCH region.
Figure 12:
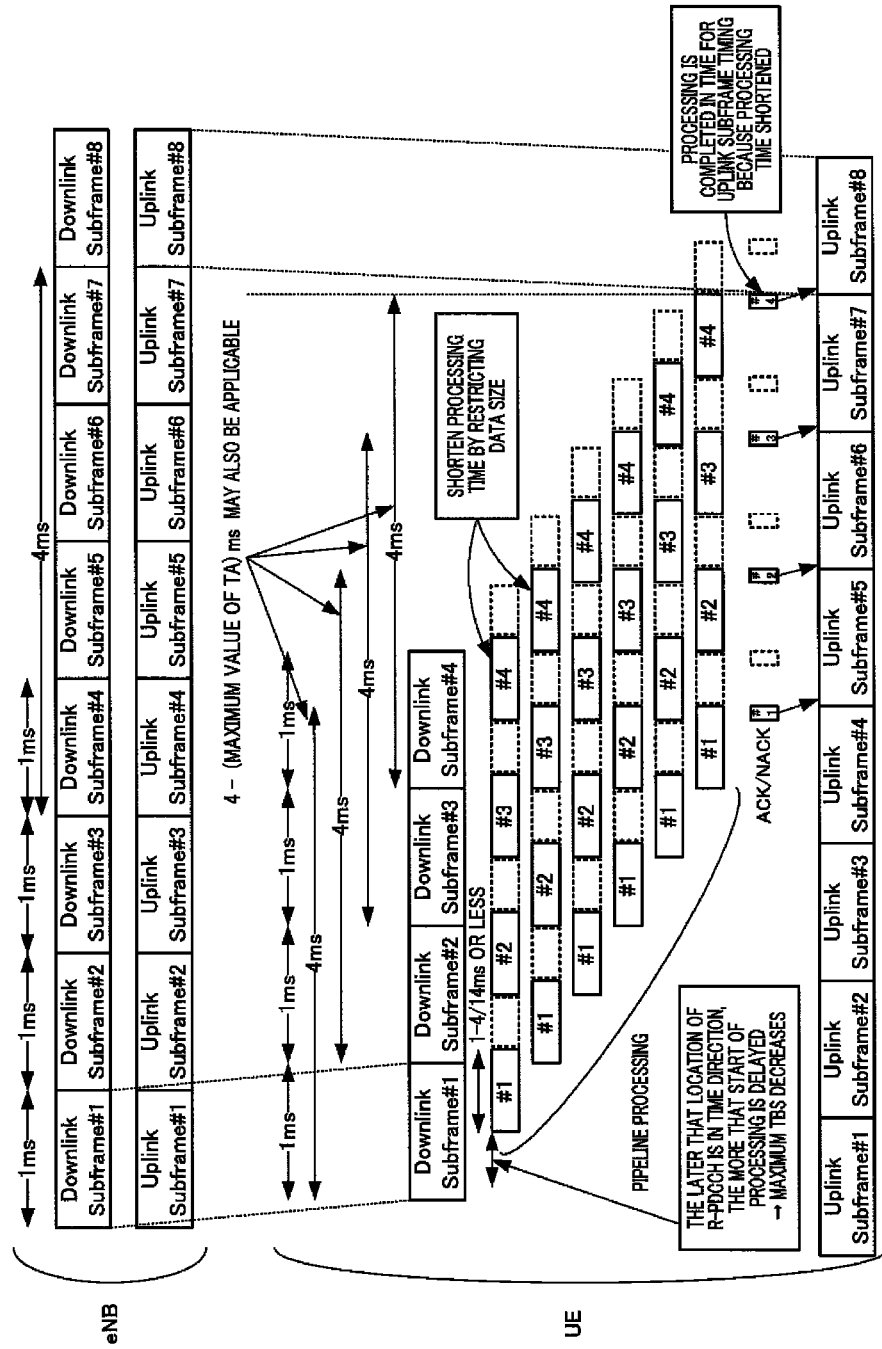
FIG. 12 is a diagram illustrating pipeline processing in a case where a DL assignment is notified of by means of an R-PDCCH region in slot 0.

Further, in the description above, pipeline processing is assumed in which the processing times of the respective processing operations are less than or equal to 1 ms so that an operation time of a turbo decoder per subframe is less than or equal to 1.0 ms so as to conform to the subframe length (1.0 ins) (see FIG. 11 and FIG. 12). In this case, FIG. 11 illustrates pipeline processing in a case where a terminal is notified of a DL assignment by means of a PDCCH region.

FIG. 12 illustrates pipeline processing in a case where a DL assignment is notified of by means of an R-PDCCH region in slot 0. When a DL assignment is notified of by means of the R-PDCCH region in slot 0, although the blind decoding start time is delayed by 4/14 ms in comparison to when a DL assignment is notified of by means of the PDCCH region, the timing for notifying of an error detection result is not delayed. Consequently, when performing pipeline processing in which processing times of the respective processing operations are less than or equal to 1 ms, the maximum transport block size when a DL assignment is notified of by means of the R-PDCCH region in slot 0 is as follows. That is, the maximum transport block size in this case is $(1-4/14) \div 1 \approx 0.71$ times a maximum transport block size in a case where a DL assignment is notified of by means of the PDCCH region. Similarly, the maximum transport block size when a DL assignment is notified of by means of the R-PDCCH region in slot 1 is $(1-11/14) \div 1 \approx 0.21$ times a maximum transport block size when a DL assignment is notified of by means of the PDCCH region. Hereinafter, for purposes of brevity, a ratio of a maximum transport block size when a DL assignment is notified of by means of the PDCCH region to a maximum transport block size when a DL assignment is notified of by means of an R-PDCCH region may be described as "restriction rate of the maximum transport block size." That is, in this case, the "restriction rate of the maximum transport block size" is 0.71 times when a DL assignment is notified of by means of the R-PDCCH region in slot 0, and is 0.21 times when a DL assignment is notified of by means of the R-PDCCH region in slot 1.

Figure 13:
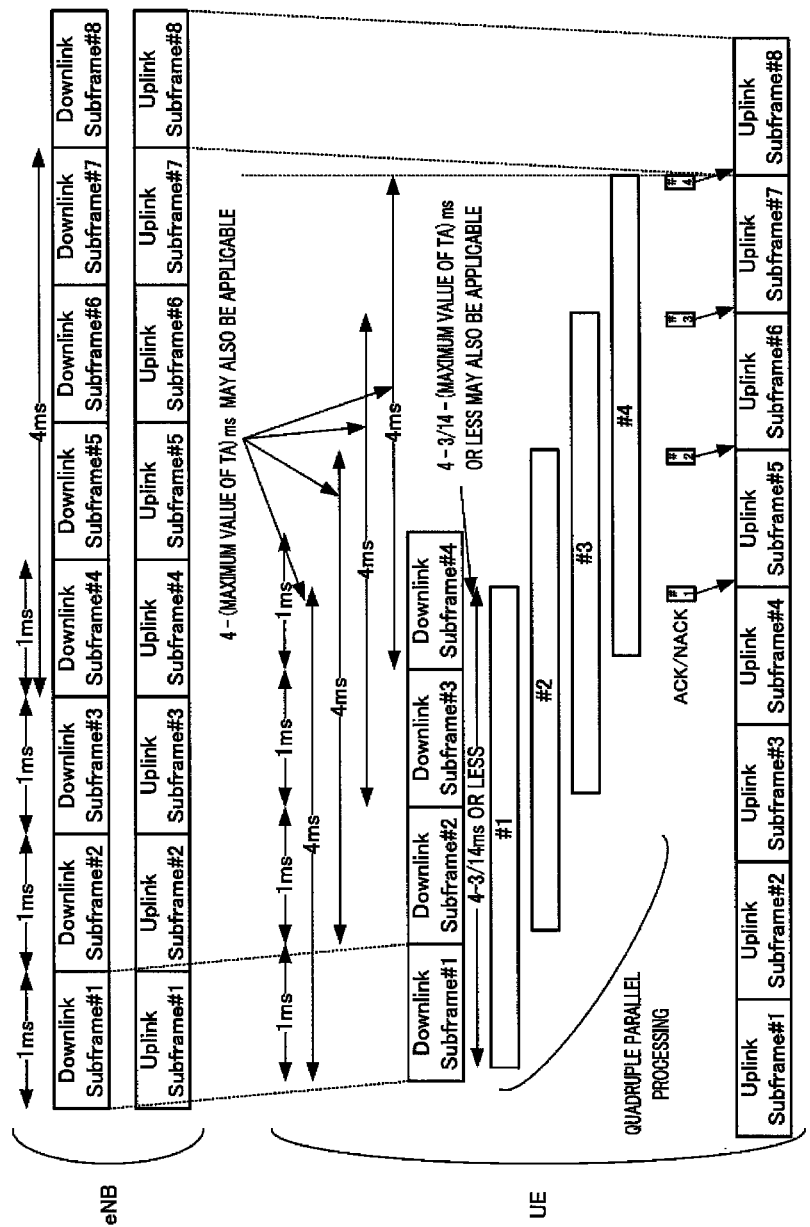
FIG. 13 is a diagram illustrating quadruple parallel processing in a case where a terminal is notified of a DL assignment by means of a PDCCH region.
Figure 14:
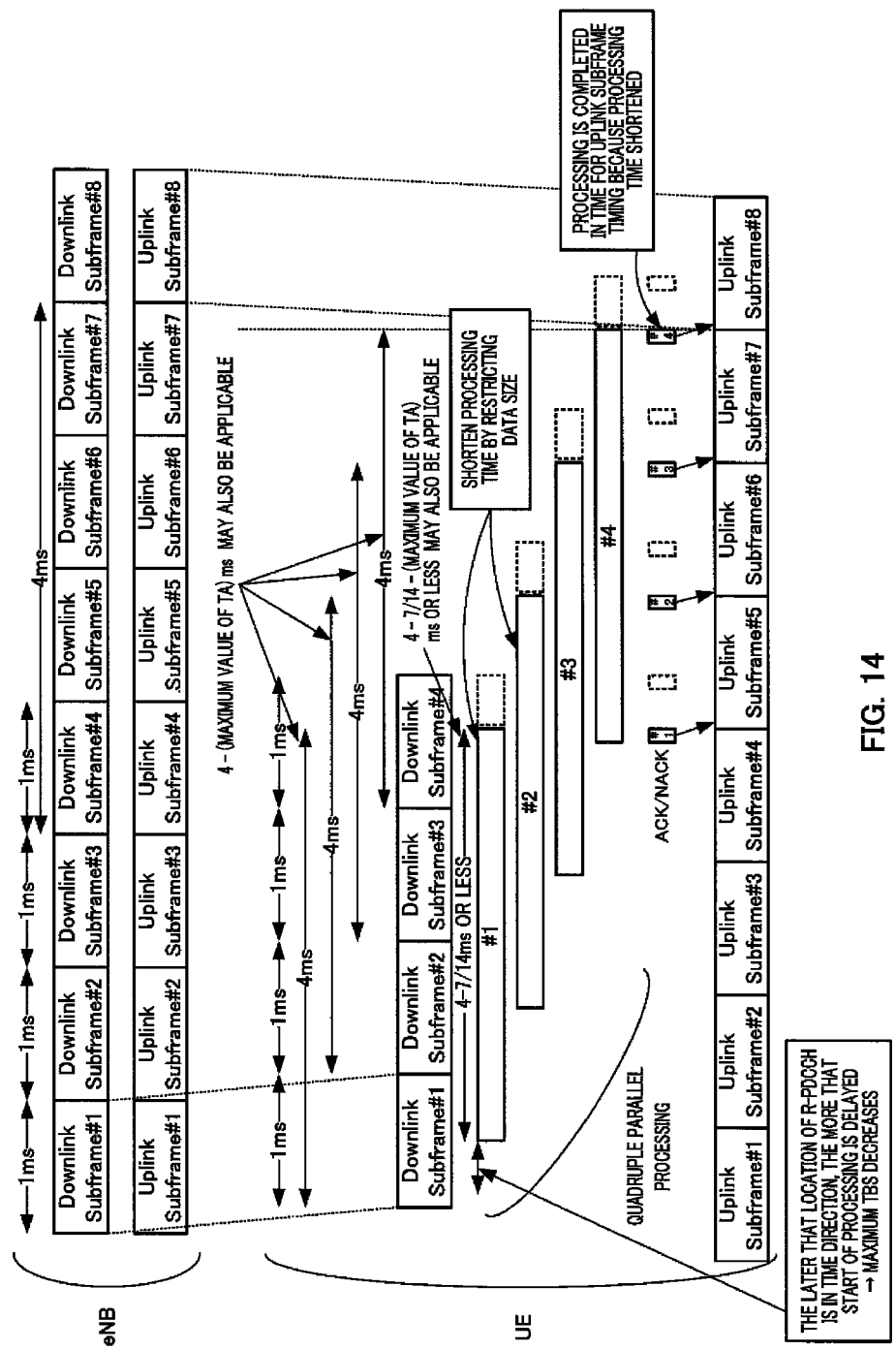
FIG. 14 is a diagram illustrating quadruple parallel processing in a case where a DL assignment is notified of by means of an R-PDCCH region in slot 0.

In contrast, more generally, quadruple parallel processing can also be performed with respect to a PDSCH in four downlink subframes (see FIG. 13 and FIG. 14). As shown in FIG. 13, in this quadruple parallel processing, when a DL assignment is notified of by means of a PDCCH region, it is sufficient to process a PDSCH that has a maximum transport block size within 11/14+3≈3.8 ms. In contrast, as shown in FIG. 14, when a DL assignment is notified of by means of an R-PDCCH region in slot 0, it is necessary to process a PDSCH within 7/14+3=3.5 ms. Therefore, the maximum transport block size when a DL assignment is notified of by means of the R-PDCCH region in slot 0 is 3.5/3.8≈0.92 times the maximum transport block size when a DL assignment is notified of by means of the PDCCH region. Similarly, when a DL assignment is notified of by means of an R-PDCCH region in slot 1, it is necessary to process a PDSCH within 3.0 ms. Therefore, the maximum transport block size when a DL assignment is notified of by means of the R-PDCCH region in slot 1 is 3.0/3.8≈0.79 times the maximum transport block size when a DL assignment is notified of by means of the PDCCH region. Specifically, in quadruple parallel processing, the "restriction rate of the maximum transport block size" is 0.92 times when a DL assignment is notified of by means of the R-PDCCH region in slot 0, and is 0.79 times when a DL assignment is notified of by means of the R-PDCCH region in slot 1.

Therefore, when performing quadruple parallel processing with respect to a PDSCH in four downlink subframes, if the maximum transport block size when a DL assignment is notified of by means of the PDCCH region is taken as 75376 bits, the maximum transport block size when a DL assignment is notified of by means of the R-PDCCH region in slot 0 is 75376×(3.5/3.8)≈69425 bits. In addition, the maximum transport block size when a DL assignment is notified of by means of the R-PDCCH region in slot 1 is 75376×(3.0/3.8)≈59507 bits.

Further, as described above, a maximum value (maximum value $t_{TA\_MAX}$ of a TA (Timing Advance) value) of a round-trip propagation delay between a base station and a terminal is, for example, in the case of a cell with a radius of 100 km, 100×10³(m)÷(3.0×10⁸ (m/s))×2 (amount of one round trip)≈0.66 ms. When this is taken into consideration, the times that can be spent on (R-)PDCCH decoding, (R-)PDSCH decoding, and ACK/NACK transmission preparation processing when DCI (DL assignment) directed to the terminal is allocated to (1) the PDCCH region, (2) the R-PDCCH region in slot 0, and (3) the R-PDCCH region in slot 1 are as follows:

(1) when DCI is allocated to the PDCCH region:
11(OFDM symbol)/14(OFDM symbol)+3−0.66≈3.1 ms
(2) when DCI is allocated to the R-PDCCH region in slot 0:
7(OFDM symbol)/14(OFDM symbol)+3−0.66≈2.8 ms
(that is, a time that is shorter by 4/14 ms compared to when DCI is allocated to the PDCCH region)
(3) when DCI is allocated to the R-PDCCH region in slot 1:
3.0−0.66≈2.3 ms (that is, a time that is shorter by 11/14 ins compared to when DCI is allocated to the PDCCH region).

Taking into account the maximum value of a TA value, when quadruple parallel processing is performed with respect to a PDSCH in four downlink subframes as shown in FIG. 13 and FIG. 14, the maximum transport block size when a DL assignment is notified of by means of the R-PDCCH region in slot 0 is 2.8/3.1≈0.91 times the maximum transport block size when a DL assignment is notified of by means of the PDCCH region. Similarly, the maximum transport block size when a DL assignment is notified of by means of the R-PDCCH region in slot 1 is 2.3/3.1≈0.74 times the maximum transport block size when a DL assignment is notified of by means of the PDCCH region. That is, in quadruple parallel processing that takes into account the maximum value of a TA value, the "restriction rate of the maximum transport block size" is 0.91 times when a DL assignment is notified of by means of the R-PDCCH region in slot 0, and is 0.74 times when a DL assignment is notified of by means of the R-PDCCH region in slot 1.

Therefore, when quadruple parallel processing that takes into account the maximum value of a TA value is performed with respect to a PDSCH in four downlink subframes, if it is assumed that the maximum transport block size when a DL assignment is notified of by means of the PDCCH region is 75376 bits, the maximum transport block size when a DL assignment is notified of by means of the R-PDCCH region in slot 0 is 75376×(2.8/3.1)≈68081 bits. Further, the maximum transport block size when a DL assignment is notified of by means of the R-PDCCH region in slot 1 is 75376×(2.3/3.1)≈55924 bits.

In addition, according to the description above, a transport block size is restricted by applying a restriction to a combination of a transport size index (I_TBS) and a number of allocated resource blocks (N_PRB) based on an R-PDCCH region to which DCI (DL assignment) is to be allocated. However, the present invention is not limited to only this method.

That is, a transport block size can be restricted by applying a restriction to only a transport block size index (I_TBS). In addition, a transport block size can be restricted by applying a restriction to only the number of allocated resource blocks (N_PRB). Further, a table that is different from the table shown in FIG. 9, that is, a table that shows transport block sizes of an (R-)PDSCH in a case where DCI is allocated to the R-PDCCH region in slot 0, with respect to combinations of a transport size index (I_TBS) and a number of allocated resource blocks (N_PRB), may also be separately provided. Further, a table that shows transport block sizes of an (R-)PDSCH in a case where DCI is allocated to the R-PDCCH region in slot 1, with respect to combinations of a transport size index (I_TBS) and a number of allocated resource blocks (N_PRB), may also be separately provided.

Alternatively, a transport block size can be restricted by applying a restriction to the number of layers. This is because the number of layers that can be supported is defined for each format of DCI (DCI format).

At least one among the following (1) to (3) is satisfied as a restriction with respect to the number of layers.

(1) A maximum value of the number of supported layers when DCI (DL assignment) is allocated to the R-PDCCH region in slot 0 is less than a maximum value of the number of supported layers when DCI is allocated to the PDCCH region.

(2) A maximum value of the number of supported layers when DCI (DL assignment) is allocated to the R-PDCCH region in slot 1 is less than a maximum value of the number of supported layers when DCI is allocated to the PDCCH region.

(3) A maximum value of the number of supported layers when DCI (DL assignment) is allocated to the R-PDCCH region in slot 1 is less than a maximum value of the number of supported layers when DCI is allocated to the PDCCH region in slot 0.

For example, it is assumed that, for a combination of a certain number of allocated resource blocks (N_PRB) and an MCS (I_MCS), the transport block size when the number of layers is 1 is 75376 bits, and the transport block size when the number of layers is 2 is 149776 bits. At this time, if it is assumed that the maximum value of the number of supported layers when DCI (DL assignment) is allocated to the PDCCH region is 2, and the maximum value of the number of supported layers when DCI is allocated to the R-PDCCH region in slot 1 is 1, the situation is as follows. In this case, even if the DCI of the PDCCH region and the DCI of the R-PDCCH region indicate the same combination of a number of allocated resource blocks (N_PRB) and an MCS (I_MCS), by restricting the maximum number of layers, the maximum transport block size (or a maximum value of a product of the code block size and the number of code blocks) can be restricted. To illustrate this more specifically, when DCI (DCI format 2) that supports transmission of up to a maximum of two layers is allocated to the PDCCH region, the base station can instruct the terminal to transmit up to a maximum of two layers. On the other hand, when DCI (DCI format 2) that supports transmission of up to a maximum of two layers is allocated to an R-PDCCH region, the base station can instruct the terminal to perform only single-layer transmission.

Alternatively, transport blocks can be restricted by applying a restriction to the DCI format itself. Specifically, a DCI format supported in a case where DCI (DL assignment) is allocated to a PDCCH region is assumed to be a DCI format that supports only single-layer transmission or a DCI format that supports transmission of up to a maximum of two layers. Further, a DCI format supported in a case where DCI is allocated to the R-PDCCH region in slot 1 is assumed to be a DCI format that supports only single-layer transmission.

However, even when any of the methods of restricting a transport block that are described above are used, a transport block size of an (R-)PDSCH when DCI is allocated to an R-PDCCH region must not exceed a value obtained by multiplying a maximum transport block size of a PDSCH when DCI is allocated to the PDCCH region by the "restriction rate of the maximum transport block size."

(Embodiment 2)

In Embodiment 2 also, similarly to Embodiment 1, in accordance with a downlink data size indicated by DCI, a mapping region in which the DCI is mapped is configured from among a PDCCH region, an R-PDCCH region in slot 0, and an R-PDCCH region in slot 1 that are provided in sequential order in the time direction within a subframe. However, according to Embodiment 2, when there are a plurality of resource regions as mapping region candidates that correspond to a downlink data size, an order of priority in which the plurality of resource regions are to be configured as a mapping region is set. The base station and the terminal according to Embodiment 2 share the same basic configurations as those in Embodiment 1. Accordingly, a description will be provided referring back to FIGS. 7 and 8.

In base station 100 of Embodiment 2, when there are a plurality of resource regions as mapping region candidates that correspond to a downlink data size, configuration section 101 configures a certain resource region as a mapping region with priority over other resource regions.

This configuration of a mapping region is performed, for example, as follows.

(1) When a transport size indicated by DCI targeted for processing is less than or equal to 16152 bits (i.e., when the downlink data size is small), configuration section 101 sets the order of priority as, first, the R-PDCCH region in slot 0 and the R-PDCCH region in slot 1, and second, the PDCCH region, and configures a mapping region according to this order of priority. That is, the R-PDCCH region in slot 0 and the R-PDCCH region in slot 1 are configured as a mapping region with priority over the PDCCH region.

(2) When a transport size indicated by DCI targeted for processing is greater than 16152 bits and less than or equal to 53840 bits (i.e., when the downlink data size is a medium size), configuration section 101 sets the order of priority as, first, the R-PDCCH region in slot 1, and second, the PDCCH region, and configures a mapping region according to this order of priority. Since 16152 bits exceed the maximum size value of the R-PDCCH region in slot 0, the R-PDCCH region in slot 0 is excluded from the mapping region candidates. That is, the R-PDCCH region in slot 1 is configured as a mapping region with priority over the PDCCH region.

(3) When a transport size indicated by DCI targeted for processing is greater than 53840 bits (i.e., when the downlink data size is large), configuration section 101 configures the PDCCH region as a mapping region.

In this case, in the actual operations of a base station, if the allocation of a PDCCH region is expected to be tight due to a large number of terminals communicating under the control of the base station, it is estimated that DCI for a terminal will be allocated to an R-PDCCH region. Accordingly, by configuring mapping regions according to the above described priority, it is possible to reduce the possibility itself of a situation arising in which allocation of a PDCCH region is tight.

In the description above, similarly to Embodiment 1, an example in which N=3 is described. However, the value of N is not particularly limited as long as N is equal to or greater than 2.

As described above, according to the present embodiment, with respect to allocation control information targeted for processing that indicates a downlink data size that is greater than a maximum size value for an $n+1^{th}$ resource region and is less than or equal to a maximum size value for an $n^{th}$ resource region, configuration section 101 configures any one of a second to an $n^{th}$ resource regions as a mapping region with priority over a first resource region.

It is thereby possible to reduce the possibility itself of a situation arising in which allocation of a PDCCH region is tight.

Note that, similarly to Embodiment 1, this method of configuring a mapping region is not limited to allocation control information (DCI), and can also be applied to uplink control information.

(Embodiment 3)

In Embodiment 3 also, similarly to Embodiment 2, when there are a plurality of resource regions as mapping region candidates that correspond to a downlink data size, an order of priority in which the plurality of resource regions are to be configured as a mapping region is set. The base station and the terminal according to Embodiment 3 share the same basic configurations as those in Embodiment 1. Accordingly, a description will be provided referring back to FIGS. 7 and 8.

In base station 100 of Embodiment 3, when there are a plurality of resource regions as mapping region candidates that correspond to a downlink data size, configuration section 101 configures a certain resource region as a mapping region with priority over other resource regions.

This configuration of a mapping region is performed, for example, as follows.

(1) When a transport size indicated by DCI targeted for processing is less than or equal to 16152 bits (i.e., when the downlink data size is small), configuration section 101 sets the order of priority as, first, the R-PDCCH region in slot 0, second, the R-PDCCH region in slot 1, and third, the PDCCH region, and configures a mapping region according to this order of priority.

(2) When a transport size indicated by DCI targeted for processing is greater than 16152 bits and less than or equal to 53840 bits (i.e., when the downlink data size is a medium size), configuration section 101 sets the order of priority as, first, the R-PDCCH region in slot 1, and second, the PDCCH region, and configures a mapping region according to this order of priority. Since 16152 bits exceed the maximum size value of the R-PDCCH region in slot 0, the R-PDCCH region in slot 0 is excluded from the mapping region candidates. That is, the R-PDCCH region in slot 1 is configured as a mapping region with priority over the PDCCH region.

(3) When a transport size indicated by DCI targeted for processing is greater than 53840 bits (i.e., when the downlink data size is large), configuration section 101 configures the PDCCH region as a mapping region.

Similar effects as in Embodiment 2 may be attained by the above method of configuring a mapping region also.

According to the present embodiment as described above, with respect to DCI targeted for processing that indicates a downlink data size that is greater than a maximum size value for an $n+1^{th}$ (n being a natural number between 2 and N, inclusive) resource region and is less than or equal to a maximum size value for an $n^{th}$ resource region, configuration section 101 configures the $n^{th}$ resource region as a mapping region with priority over a first to an $n-1^{th}$ resource regions.

It is thereby possible to reduce the possibility itself of a situation arising in which allocation of a PDCCH region is tight.

Note that, similarly to Embodiment 1, this method of configuring a mapping region is not limited to allocation control information (DCI), and can also be applied to uplink control information.

(Embodiment 4)

Although according to Embodiments 1 to 3 a downlink data size is defined as a transport block size, according to Embodiment 4 a downlink data size is defined as a product of a code block size and the number of code blocks. The base station and the terminal according to Embodiment 4 share the same basic configurations as those in Embodiment Accordingly, a description will be provided referring back to FIGS. 7 and 8.

That is, in practice, the operation of a turbo decoder in a terminal is dependent on a plurality of code block sizes that are calculated on the basis of a transport block. Accordingly, in Embodiment 4, configuration section 101 configures a mapping region in which DCI is mapped, from among a PDCCH region, an R-PDCCH region in slot 0, and an R-PDCCH region in slot 1 that are provided in sequential order in the time direction within a subframe, in accordance with a product of a code block size and the number of code blocks.

Accordingly, a maximum size value of a downlink data size that is indicated by DCI that can be configured in each resource region is also defined by a product of a code block size and the number of code blocks.

In this case, a maximum value that may be set as a maximum size value can be calculated in the manner described below.

A maximum value of a "product of a code block size and the number of code blocks" when DCI is allocated to a PDCCH is 5824 (code block size)×13 (number of code blocks)=75712 bits. This is because CRC bits including 24 bits for each code block and the transport block are added to the maximum transport block size (=75376). That is, a total of 336 bits are added that include 24×13 (number of code blocks)=312 bits as CRC for the code blocks and 24 bits as CRC for the transport block. Further, the number of code blocks is determined as an integer obtained by dividing a value obtained by adding CRC for the transport block to the transport block size by a segmentation size=6144 and rounding up any digits after the decimal point of the resultant value. That is, since (75376+24)/6144=12.27 . . . , the number of code blocks is calculated as 13.

Therefore, a maximum value of values that may be assumed for a "product of a code block size and the number of code blocks" is 75712×(1−4/14)=54080 when DCI is allocated to the R-PDCCH region in slot 0, and is 75712×(1−11/14)=16224 when DCI is allocated to the R-PDCCH region in slot 1.

When transport block sizes are calculated back from a "product of a code block size and the number of code blocks", the values are as follows:

(1) when DCI is allocated to the R-PDCCH in slot 0:
53840=6016 (first code block size)×8 (first number of code blocks)+5952 (second code block size)×1 (second number of code blocks)−24 (CRC for code block)×9 (total number of code blocks)−24 (CRC for transport block)

(2) when DCI is allocated to the R-PDCCH in slot 1:
16128=5440 (first code block size)×2 (first number of code blocks)+5376 (second code block size)×1 (second number of code blocks)−24 (CRC for code block)×3 (total number of code blocks)−24 (CRC for transport block)−32 (filler bits)

Note that, since a code block size that may be assumed is a discrete value, the code block sizes are made to correspond to a transport block size by using a first code block and a second code block of different sizes. Further, since a transport block size is also a discrete value, filler bits are added to correspond to a discrete, specified transport block size.

In practice, it is sufficient if the operation time of a turbo decoder is less than or equal to 1 ms. Accordingly, if it is assumed that a "product of a code block size and the number of code blocks" when DCI is allocated to a PDCCH is 75712, the maximum transport block size when DCI is allocated to an R-PDCCH region in slot 0 is less than or equal to 53840. Further, the maximum transport block size when DCI is allocated to an R-PDCCH region in slot 1 is less than or equal to 16128.

Further, in the description above, pipeline processing is assumed in which the processing times of the respective processing operations are less than or equal to 1 ms so that an operation time of a turbo decoder per subframe is less than or equal to 1.0 ms so as to conform to the subframe length (1.0 ms) (see FIG. 11 and FIG. 12). In this case, FIG. 11 illustrates pipeline processing in a case where a terminal is notified of a DL assignment by means of a PDCCH region.

FIG. 12 illustrates pipeline processing in a case where a DL assignment is notified of by means of an R-PDCCH region in slot 0. When a DL assignment is notified of by means of the R-PDCCH region in slot 0, although the blind decoding start time is delayed by 4/14 ms in comparison to when a DL assignment is notified of by means of the PDCCH region, the timing for notifying of an error detection result is not delayed. Consequently, when performing pipeline processing in which processing times of the respective processing operations are less than or equal to 1 ms, the maximum value of the "product of a code block size and the number of code blocks" when a DL assignment is notified of by means of the R-PDCCH region in slot 0 is (1−4/14)÷1≈0.71 times the maximum value of the "product of a code block size and the number of code blocks" when a DL assignment is notified of by means of the PDCCH region. Similarly, when a DL assignment is notified of by means of the R-PDCCH region in slot 1, the maximum value is (1−11/14)÷1≈0.21 times the maximum value of the "product of a code block size and the number of code blocks" when a DL assignment is notified of by means of the PDCCH region.

On the other hand, more generally, quadruple parallel processing can also be performed with respect to a PDSCH in four downlink subframes (see FIG. 13 and FIG. 14). As shown in FIG. 13, in this quadruple parallel processing, when a DL assignment is notified of by means of a PDCCH region, it is sufficient to process a PDSCH that has a maximum value of a "product of a code block size and the number of code blocks" within 11/14+3≈3.8 ms. In contrast, as shown in FIG. 14, when a DL assignment is notified of by means of an R-PDCCH region in slot 0, it is necessary to process a PDSCH within 7/14+3=3.5 ms. Therefore, the maximum value of a "product of a code block size and the number of code blocks" when a DL assignment is notified of by means of the R-PDCCH region in slot 0 is 3.5/3.8≈0.92 times the maximum transport block size when a DL assignment is notified of by means of the PDCCH region. Similarly, when a DL assignment is notified of by means of an R-PDCCH region in slot 1, it is necessary to process a PDSCH within 3.0 ms. Therefore, the maximum value of a "product of a code block size and the number of code blocks" when a DL assignment is notified of by means of the R-PDCCH region in slot 1 is 3.0/3.8≈0.79 times the maximum value of a "product of a code block size and the number of code blocks" when a DL assignment is notified of by means of the PDCCH region. Specifically, in quadruple parallel processing, a "restriction rate of the maximum value of a product of a code block size and the number of code blocks" is 0.92 times when a DL assignment is notified of by means of the R-PDCCH region in slot 0, and is 0.79 times when a DL assignment is notified of by means of the R-PDCCH region in slot 1.

(Embodiment 5)

Although according to Embodiments 1 to 3 a downlink data size is defined as a transport block size, according to Embodiment 5 a downlink data size is defined as an MCS (I_MCS) that corresponds to a number of allocated resource blocks (N_PRB). The base station and the terminal according to Embodiment 5 share the same basic configurations as those in Embodiment 1. Accordingly, a description will be provided referring back to FIGS. 7 and 8.

That is, as described above, a transport block size is defined by a number of allocated resource blocks (N_PRB) and an MCS (I_MCS) included in DCI. Therefore, in Embodiment 5, in accordance with an MCS (I_MCS) that corresponds to a number of allocated resource blocks (N_PRB), configuration section 101 configures a mapping region in which DCI is mapped, from among a PDCCH region, an R-PDCCH region in slot 0, and an R-PDCCH region in slot 1 that are provided in sequential order in the time direction within a subframe.

Accordingly, a maximum size value of a downlink data size that is indicated by DCI that can be configured in each resource region is also defined by an MCS (I_MCS) that corresponds to a number of allocated resource blocks (N_PRB). In this case, it is necessary for a maximum transport block size when DCI is to be allocated to an R-PDCCH region to be less than or equal to the values defined in Embodiments 1 to 4.

Based on the foregoing, for example, in tables in which MCS indices (I_MCS) and transport size indices (I_TBS) are associated with each other that are shown in FIG. 15, the MCS indices (I_MCS) and transport size indices (I_TBS) are divided into three groups. Further, the tables in which the MCS indices (I_MCS) and the transport size indices (I_TBS) are associated with each other are stored for each range of the number of allocated resource blocks (N_PRB). FIG. 15A is a table corresponding to a range in which the number of allocated resource blocks (N_PRB) is from 81 to 90. FIG. 15B is a table corresponding to a range in which the number of allocated resource blocks (N_PRB) is from 91 to 100.

In the tables in FIG. 15, in region 1, MCS indices (I_MCS) are defined for which mapping is performed only to the PDCCH region, and is not performed to the R-PDCCH region in slot 0 or the R-PDCCH region in slot 1. In region 2, MCS indices (I_MCS) are defined for which mapping is performed only to the R-PDCCH region in slot 0 or the PDCCH region, and is not performed to the R-PDCCH region in slot 1. Further, in region 3, MCS indices (I_MCS) are defined for which mapping is performed to the R-PDCCH region in slot 0, the R-PDCCH region in slot 1, and the PDCCH region.

(Embodiment 6)

According to Embodiments 1 to 5 the amount of information (i.e. the number of DCI bits) to be communicated by DCI is decreased by providing a maximum size value for a downlink data size indicated by DCI that can be configured in each resource region. Embodiment 6 describes application variations with respect to the decreased number of bits.

That is, as shown in FIG. 15, since I_MCS may assume a value from 0 to 31, the number of bits of I_MCS is five. However, when N_PRB is from 91 to 100, the maximum value of I_MCS in the R-PDCCH region in slot 1 is 10. Therefore, four bits is adequate as the number of bits of I_MCS in the R-PDCCH region in slot 1. That is, the number of DCI bits is decreased by one bit.

The variations below are conceivable as application variations that utilize the decreased number of DCI bits.

<Variation 1>

The decreased number of DCI bits can be utilized to allocate a parity bit of the DCI. It is thereby possible to improve an error rate characteristic with respect to the DCI.

<Variation 2>

The decreased number of DCI bits is utilized for allocating information that represents whether or not there is DCI (or UCI) for the same terminal as that for the current DCI in a PDCCH region (or R-PDCCH region) that is located later in the time domain than the slot in which the current DCI is located. It is thereby possible to reduce a blind decoding load at the terminal.

<Variation 3>

The decreased number of DCI bits is utilized for allocating information that limits a CCE aggregation level of DCI (or UCI) for the same terminal as that for the current DCI in a PDCCH region (or R-PDCCH region) that is located later in the time domain than the slot in which the current DCI is located. It is thereby possible to reduce a blind decoding load at the terminal.

<Variation 4>

The decreased number of DCI bits is utilized for allocating information that limits the number of blind decoding operations with respect to a CCE aggregation level of DCI (or UCI) for the same terminal as that for the current DCI in a PDCCH region (or R-PDCCH region) that is located later in the time domain than the slot in which the current DCI is located. It is thereby possible to reduce a blind decoding load at the terminal.

<Variation 5>

The decreased number of DCI bits is utilized for allocating information that represents whether or not there is UCI for the same terminal as that for the current DCI in an R-PDCCH region in which the current DCI is located. It is thereby possible to reduce a blind decoding load at the terminal.

<Variation 6>

The decreased number of DCI bits is utilized for allocating information that limits a CCE aggregation level of UCI for the same terminal as that for the current DCI in an R-PDCCH region in which the current DCI is located. It is thereby possible to reduce a blind decoding load at the terminal.

<Variation 7>

The decreased number of DCI bits is utilized for allocating information that limits the number of blind decoding operations with respect to a CCE aggregation level of UCI for the same terminal as that for the current DCI in an R-PDCCH region in which the current DCI is located. It is thereby possible to reduce a blind decoding load at the terminal.

(Embodiment 7)

According to Embodiment 1, a downlink maximum data size is calculated in a case where a DL assignment is allocated to an R-PDCCH region on the basis of a time during which processing is possible at a terminal, without taking a TA value into consideration or while fixing the TA value at a maximum value. In contrast, according to Embodiment 7, a downlink maximum data size when a DL assignment is allocated to an R-PDCCH region is calculated in a case in which a TA value is taken as a variable. The base station and the terminal according to Embodiment 7 share the same basic configurations as those in Embodiment 1. Accordingly, a description will be provided referring back to FIGS. 7 and 8.

As used herein, the term "TA value" refers to a TA value that is assumed by the base station. That is, the base station can notify a terminal of an absolute value of a TA value and relative values for successively correcting the TA value. Therefore, a TA value that the base station assumes is the sum of the absolute value that the base station notified the terminal of and an accumulative value of relative values that the base station notified the terminal of up to the current time. Note that, if the terminal fails to receive an absolute value or a relative value of a TA value that the base station notified the terminal of, or if the terminal absorbs a deviation in the transmission timing from the reception timing caused by movement of the terminal itself or a clock drift, the terminal can autonomously correct a TA value that is actually being used. Therefore, a TA value that is assumed by the base station and a TA value that the terminal is actually using do not necessarily match.

In base station 100, in accordance with a downlink data size indicated by DCI, configuration section 101 configures a mapping region to which the DCI is to be mapped, from among a PDCCH region, an R-PDCCH region in slot 0, and an R-PDCCH region in slot 1 that are provided in sequential order in the time direction within a subframe.

A configuration rule table is used for this configuration of a mapping region. In the configuration table, a PDCCH region and a maximum size value of a downlink data size indicated by DCI that can be configured in the PDCCH region are associated with each other. Further, each of an R-PDCCH region in slot 0 and an R-PDCCH region in slot 1, a TA value, and a maximum size value of a downlink data size indicated by DCI that can be configured in each resource region are associated with each other. Here, a downlink data size is defined as a transport block size.

More specifically, a maximum size value of the downlink data size indicated by DCI that can be configured in a PDCCH region is defined by a maximum value of the TA value, and assumes a fixed value irrespective of the size of the TA value. On the other hand, a maximum size value of a downlink data size indicated by DCI that can be configured in an R-PDCCH region is defined by a difference between a maximum value of the TA value and the TA value, and thus increases with decrease in the TA value. Accordingly, when the TA value assumes the maximum value, the maximum size value decreases in the order of the PDCCH region, the R-PDCCH region in slot 0, and the R-PDCCH region in slot 1. As the TA value decreases from the maximum value, the maximum size value of a downlink data size indicated by DCI that can be configured in the R-PDCCH region in slot 0 and the R-PDCCH region in slot 1 increases. However, at any TA value, the maximum size value of a downlink data size indicated by DCI that can be configured in the R-PDCCH region in slot 0 is greater than the maximum size value of a downlink data size indicated by DCI that can be configured in the R-PDCCH region in slot 1.

That is, for the PDCCH region, configuration section 101 configures a mapping region on the basis of the configuration rule table and a data size indicated by the DCI and a maximum value of the TA value. In contrast, for the R-PDCCH region in slot 0 and the R-PDCCH region in slot 1, configuration section 101 configures a mapping region on the basis of the configuration rule table and a data size indicated by the DCI and the TA value.

Note that, in the description above, it is assumed that only a maximum size value of a downlink data size indicated by DCI that can be configured in an R-PDCCH region depends on the TA value (the maximum size value increases as the TA value decreases). However, the present invention is not limited thereto, and a maximum size value of a downlink data size indicated by DCI that can be configured in a PDCCH region may also depend on the TA value (the maximum size value increases as the TA value decreases).

Here, a time that can be spent on R-PDCCH processing and (R-)PDSCH processing differs between a case where a mapping region of DCI is the PDCCH region, the R-PDCCH region in slot 0, and the R-PDCCH region in slot Accordingly, by decreasing the maximum size value as the time that can be spent on R-PDCCH processing and (R-)PDSCH processing decreases, terminal 200 that is the receiving side for the DCI and downlink data can satisfy a requirement with respect to a predetermined ACK/NACK transmission timing even when performing processing at a processing speed equivalent to that of PDCCH processing and PDSCH processing in an LTE terminal.

In terminal 200, PDSCH receiving section 208 that has a decoding circuit decodes PDSCH signals received from demultiplexing section 205, based on the downlink resource allocation information received from PDCCH receiving section 207, to obtain the received data (downlink data). PDSCH receiving section 208 also detects any error in the received data (i.e., downlink data). If an error is found in the received data as a result of the error detection, PDSCH receiving section 208 generates NACK signals as ACK/NACK signals. If no error is found in the received data, PDSCH receiving section 208 generates ACK signals as ACK/NACK signals.

In this case, a maximum value that may be set as a maximum size value can be calculated in the manner described below.

The times that can be spent on (R-)PDCCH decoding, (R-)PDSCH decoding, and ACK/NACK transmission preparation processing when DCI directed to the terminal is allocated to (1) a PDCCH region, (2) an R-PDCCH region in slot 0, and (3) an R-PDCCH region in slot 1 are as follows:

(1) when DCI is allocated to the PDCCH region:

11(OFDM symbol)/14(OFDM symbol)+3−$t_{TA\_MAX}$ (maximum value of TA value)≈3.8−$t_{TA\_MAX}$ ms (2) when DCI is allocated to the R-PDCCH region in slot 0:
7(OFDM symbol)/14(OFDM symbol)+3−$t_{TA}$ (TA value ($0 \leq t_{TA} \leq t_{TA\_MAX}$))=3.5−$t_{TA}$ ms (that is, a time that is shorter by 4/14−($t_{TA\_MAX}$−$t_{TA}$) ms compared to when DCI is allocated to the PDCCH region)

(3) when DCI is allocated to the R-PDCCH region in slot 1:
3.0−$t_{TA}$ ms (that is, a time that is shorter by 11/14−($t_{TA\_MAX}$−$t_{TA}$) ms compared to when DCI is allocated to the PDCCH region).

On the other hand, the maximum operation time of a turbo decoder that is considered to be a processing bottleneck is 1.0 ms with respect to the maximum transport block size (=75376) that can be allocated to the PDCCH region. The reason for this is that when data is continuously transmitted with the maximum transport block size, if the required processing time exceeds one subframe length (1.0 ms), the decoding operations cannot keep pace with the amount of transmitted data. In a turbo decoder, parallel processing or the like is performed to shorten the operation time so that the maximum operation time of the turbo decoder becomes less than or equal to one subframe length (=1.0 ms). Note that, although it is assumed that the maximum operation time of the turbo decoder becomes less than or equal to 1.0 ms, this situation is not limited to a turbo decoder, and the intention herein is that the maximum operation time of processing that requires the most time in (R-)PDSCH decoding becomes less than or equal to 1.0 ms. In the description hereinafter, it is assumed that the processing that requires the most time is that of a turbo decoder.

Therefore, the maximum value that a transport block size may assume when DCI is allocated to an R-PDCCH region in slot 0 is 75376×(1−(4/14−($t_{TA\_MAX}$−$t_{TA}$)) 53840+75376×($t_{TA\_MAX}$−$t_{TA}$) (i.e., it is sufficient if the maximum size value is less than or equal to this value). Further, the maximum value that a transport block size may assume when DCI is allocated to an R-PDCCH region in slot 1 is 75376×(1−(11/14−($t_{TA\_MAX}$−$t_{TA}$))=16152+75376×($t_{TA\_MAX}$−$t_{TA}$) (i.e., it is sufficient if the maximum size value is less than or equal to this value).

In practice, it is sufficient if the operation time of a turbo decoder is less than or equal to 1.0 ms. Accordingly, if the maximum transport block size when DCI is allocated to the PDCCH region is taken as 75376, the maximum transport block size when DCI is allocated to the R-PDCCH region in slot 0 is less than or equal to 53840+75376×($t_{TA\_MAX}$−$t_{TA}$). Further, the maximum transport block size when DCI is allocated to the R-PDCCH region in slot 1 is less than or equal to 16152+75376×($t_{TA\_MAX}$−$t_{TA}$).

Note that, when the TA value is less than $t_{TA\_MAX}$−4/14 ms in a case where DCI directed to the terminal is allocated to the R-PDCCH region in slot 0, the situation is as follows. In this case, a time required for (R-)PDCCH decoding of slot 0, (R-)PDSCH decoding, and ACK/NACK transmission preparation processing is longer than a time required for PDCCH decoding, PDSCH decoding, and ACK/NACK transmission preparation processing. Therefore, at this time, a maximum value that a transport block may assume when DCI is allocated to the R-PDCCH region in slot 0 may be made the same as a maximum value that a transport block may assume when DCI is allocated to the PDCCH region (in the above example, 75376). Alternatively, the aforementioned maximum value may be made greater than a maximum value that a transport block may assume when DCI is allocated to the PDCCH region (=75376). Hereinafter, when a TA value is less than $t_{TA\_MAX}$−4/14 ms, a maximum value that a transport block may assume when DCI is allocated to the R-PDCCH region in slot 0 is described as being the same as a maximum value that a transport block may assume when DCI is allocated to the PDCCH region (in the above example, 75376).

In the table shown in FIG. 9 in which transport block sizes are associated with pairs composed of a transport size index (I_TBS) and a number of allocated resource blocks (N_PRB), the transport block sizes are divided into three groups. In the table in FIG. 9, transport blocks indicated by DCI that is not mapped to the R-PDCCH region in slot 0 or the R-PDCCH region in slot 1 and is mapped only to the PDCCH region are specified in region 1. Transport blocks indicated by DCI that is not mapped to the R-PDCCH region in slot 1 and is mapped only to the R-PDCCH region in slot 0 or the PDCCH region are specified in region 2. Further, transport blocks indicated by DCI that is mapped to the R-PDCCH region in slot 0, the R-PDCCH region in slot 1 and the PDCCH region are specified in region 3. Furthermore, the regions denoted as region 1, region 2, and region 3 fluctuate based on the TA value. More specifically, since a transport block size can be increased as the TA value decreases, the boundary between region 3 and region 2 transits downward within the table in FIG. 9. At the same time, the boundary between region 2 and region 1 also transits downward within the table in FIG. 9. If the TA value is less than $t_{TA\_MAX}$−4/14 ms, the boundary between region 2 and region 1 transits as far as the lower limit within the table in FIG. 9 (in this case, region 1 disappears). That is, when DCI is allocated to an R-PDCCH region, the maximum transport block size that can be allocated to an (R-)PDSCH can be increased as a TA value decreases from the maximum value of the TA value.

The transport block sizes are described above as being divided into three groups. However, the transport block sizes can also be divided into two groups by making the maximum transport block size when DCI is allocated to the R-PDCCH region in slot 0 match the maximum transport block size when DCI is allocated to the R-PDCCH region in slot 1 and taking these together as one group. That is, in this case, in FIG. 9, transport blocks indicated by DCI that is not mapped to the R-PDCCH region in slot 0 or the R-PDCCH region in slot 1 and is mapped only to the PDCCH region are specified in region 1 and region 2. Further, transport blocks indicated by DCI that is mapped to the R-PDCCH region in slot 0, the R-PDCCH region in slot 1 and the PDCCH region are specified in region 3.

In addition, in a case where DCI (DL assignment) is specified as not being allocated to the R-PDCCH region in slot 1 also, the transport block sizes can be divided into two groups. That is, in FIG. 9, transport blocks indicated by DCI that is not mapped to the R-PDCCH region in slot 0 and is mapped only to the PDCCH region are specified in region 1. Further, transport blocks indicated by DCI that is mapped to the R-PDCCH region in slot 0 and the PDCCH region are specified in region 2 and region 3.

As described above, according to the present embodiment, in base station 100, in accordance with a downlink data size indicated by DCI, configuration section 101 configures a mapping region to which the DCI is to be mapped, from among a PDCCH region, an R-PDCCH region in slot 0, and an R-PDCCH region in slot 1 that are provided in sequential order in the time direction within a subframe.

It is thereby possible to allow leeway in data reception processing on the receiving side (terminal 200) regardless of a time position of a mapping region to which DCI is mapped. Specifically, operations in an over-engineered state can be avoided when performing data reception processing during LTE operations, while securing a larger processing time margin for an R-PDCCH on the receiving side (terminal 200).

In a configuration rule table that is used for configuring the mapping regions, a PDCCH region and a maximum size value of the downlink data size indicated by DCI that can be configured in the PDCCH region are associated with each other. Further, in the configuration rule table, each of an R-PDCCH region in slot 0 and an R-PDCCH region in slot 1, a TA value, and a maximum size value of a downlink data size indicated by DCI that can be configured in each resource region are associated with each other. Here, a downlink data size is defined as a transport block size. Further, the respective maximum size values are different for the PDCCH region, the R-PDCCH region in slot 0, and the R-PDCCH region in slot 1.

In the foregoing, a case is described in which DCI (=DL assignment) is allocated to a PDCCH region, an R-PDCCH region in slot 0, and an R-PDCCH region in slot 1. However, the present invention is not limited thereto, and for example, even if it is specified that a DL assignment is not allocated to an R-PDCCH region in slot 1, it is sufficient to decrease the maximum size values in the order of the PDCCH region and the R-PDCCH region in slot 0 in accordance with the amount of decrease in the time that can be spent on R-PDCCH processing and (R-)PDSCH processing (slot 0 only). That is, the above described method of configuring a mapping region is effective when a DL assignment can be allocated to two or more regions among a PDCCH region, an R-PDCCH region in slot 0, and an R-PDCCH region in slot 1.

In essence, it is sufficient that, in accordance with a downlink data size indicated by DCI targeted for processing, configuration section 101 in base station 100 configures a mapping region to which the DCI targeted for processing is mapped, from among a first to an $N^{th}$ (N being a natural number no less than 2) resource regions that are provided in sequential order in the time direction within a communication unit time (for example, a subframe).

Figure 16:
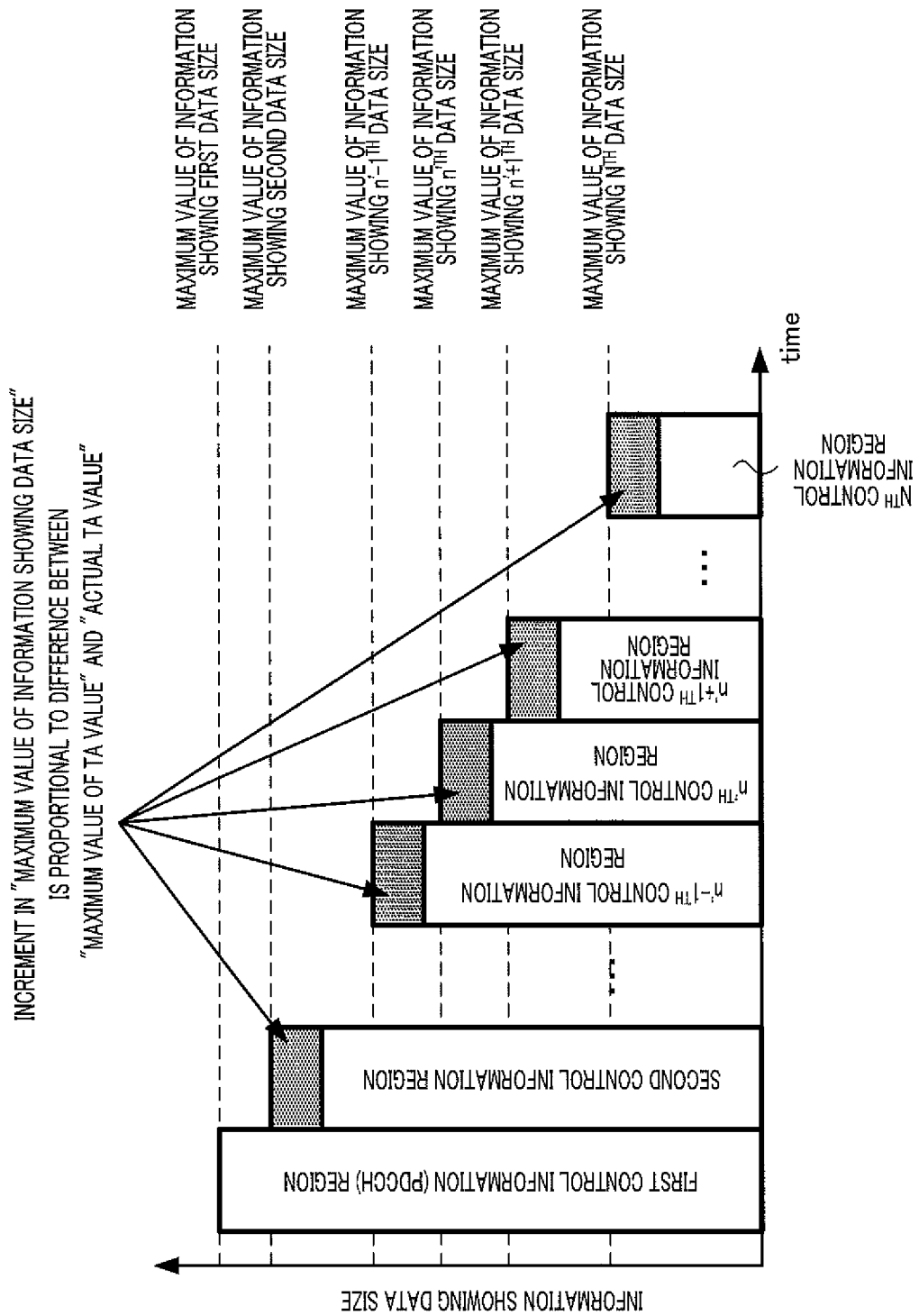
FIG. 16 is a diagram for explaining maximum size values for a PDCCH region, an R-PDCCH region in slot 0, or an R-PDCCH region in slot 1 according to Embodiment 7.

In addition, although the above description relates to allocation control information (DCI) including information about a resource region to which downlink data is allocated and data size information about a size of the downlink data, the present invention is not limited thereto and can also be applied to uplink control information. In essence, it is sufficient that, in accordance with a data size indicated by control information targeted for processing, a mapping region to which the control information targeted for processing is mapped is configured from among a first to an $N^{th}$ (N being a natural number no less than 2) resource regions that are provided in sequential order in the time direction within a communication unit time. In this case, it is sufficient that in a configuration rule table that is used for configuring a mapping region, as shown in FIG. 16, first to $N^{th}$ resource regions, TA values, and maximum size values of downlink data sizes indicated by the allocation control information that can be configured in each resource region are associated with each other, and a maximum size value for an $n'^{th}$ resource region (n' being a natural number between 3 and N, inclusive) among the first to $N^{th}$ resource regions is smaller than a maximum size value for an $n'-1^{th}$ resource region. In this connection, the first resource region in FIG. 16 represents a PDCCH region.

Figure 17:
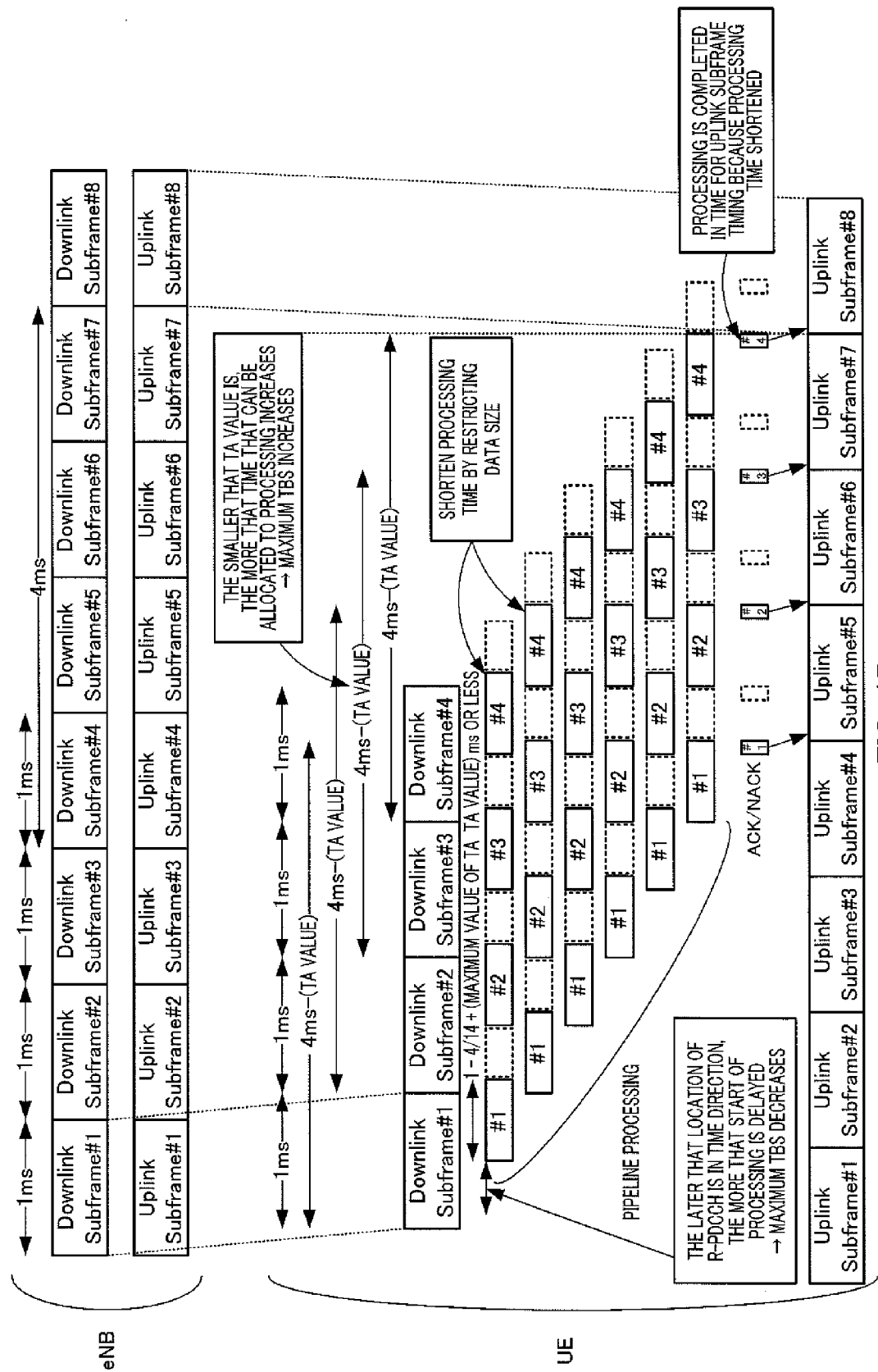
FIG. 17 is a diagram illustrating pipeline processing in a case where a terminal is notified of a DL assignment by means of an R-PDCCH region in slot 0.

Further, in the description above, pipeline processing is assumed in which the processing times of the respective processing operations are less than or equal to 1 ms so that an operation time of a turbo decoder per subframe is less than or equal to 1.0 ms so as to conform to the subframe length (1.0 ms) (see FIG. 11 and FIG. 17). In this case, FIG. 11 illustrates pipeline processing in a case where a terminal is notified of a DL assignment by means of a PDCCH region.

FIG. 17 illustrates pipeline processing in a case where a DL assignment is notified by means of an R-PDCCH region in slot 0. When a DL assignment is notified of by means of the R-PDCCH region in slot 0, although the blind decoding start time is delayed by 4/14 ms in comparison to when a DL assignment is notified of by means of the PDCCH region, the timing for notifying of an error detection result is not delayed. Consequently, when performing pipeline processing in which processing times of the respective processing operations are less than or equal to 1 ms, the maximum transport block size when a DL assignment is notified of by means of the R-PDCCH region in slot 0 is $(1-4/14+(t_{TA\_MAX}-t_{TA}))\div 1 \approx 0.71+(t_{TA\_MAX}-t_{TA})$ times a maximum transport block size in a case where a DL assignment is notified of by means of the PDCCH region. Similarly, the maximum transport block size when a DL assignment is notified of by means of the R-PDCCH region in slot 1 is $(1-11/14+(t_{TA\_MAX}-t_{TA}))\div 1 \approx 0.21+(t_{TA\_MAX}-t_{TA})$ times a maximum transport block size when a DL assignment is notified of by means of the PDCCH region. That is, in this case, the "restriction rate of the maximum transport block size" is $0.71+(t_{TA\_MAX}-t_{TA})$ times when a DL assignment is notified of by means of the R-PDCCH region in slot 0, and is $0.21+(t_{TA\_MAX}-t_{TA})$ times when a DL assignment is notified of by means of the R-PDCCH region in slot 1.

Figure 18:
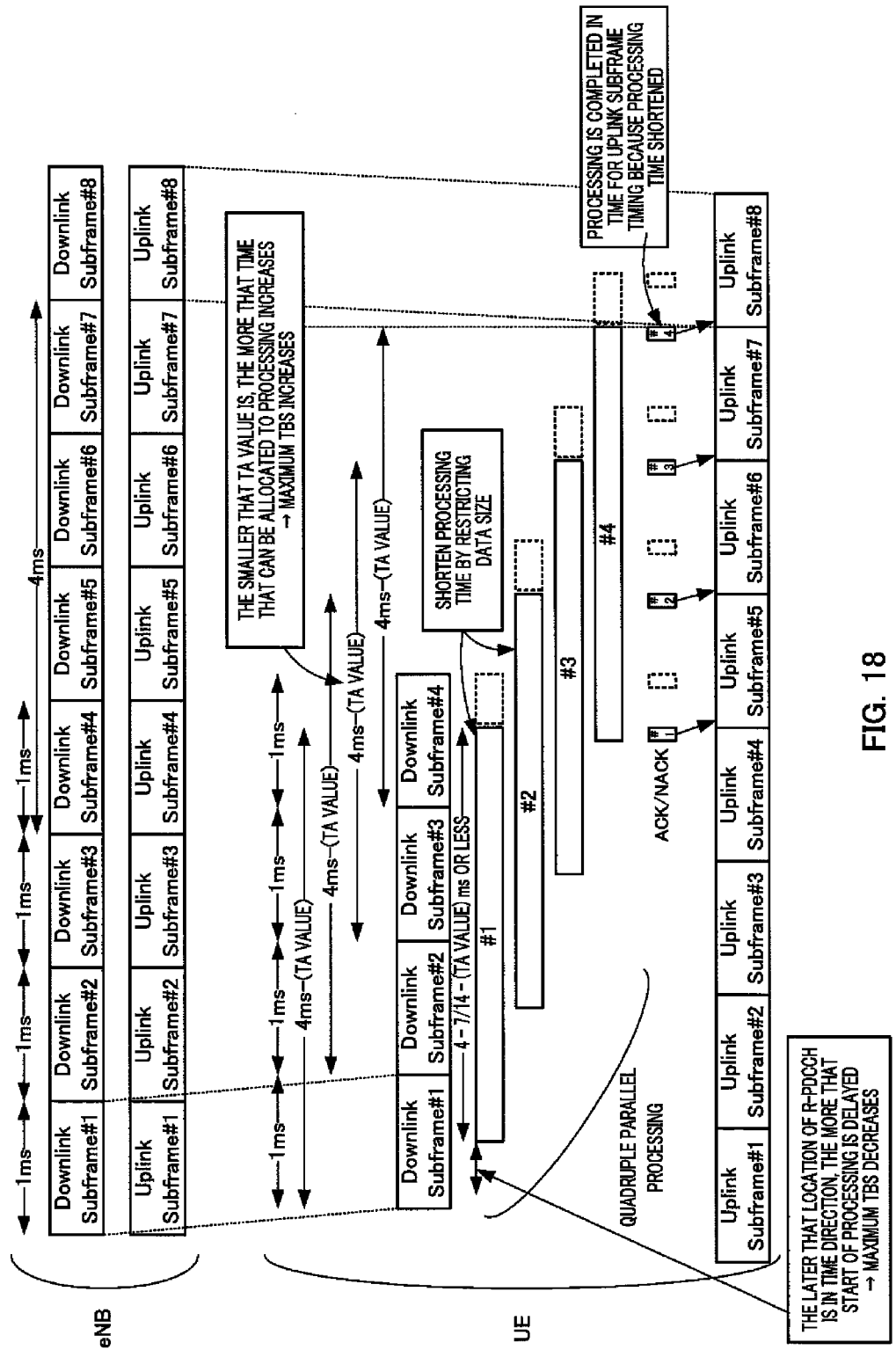
FIG. 18 is a diagram illustrating quadruple parallel processing in a case where a terminal is notified of a DL assignment by means of an R-PDCCH region in slot 0.

In contrast, more generally, quadruple parallel processing can also be performed with respect to a PDSCH in four downlink subframes (see FIG. 13 and FIG. 18). Here, as shown in FIG. 13, when a DL assignment is notified of by means of a PDCCH region, it is sufficient to process a PDSCH that has a maximum transport block size within $11/14+3-t_{TA\_MAX} \approx 3.8 \text{ ms}-t_{TA\_MAX}$. In contrast, as shown in FIG. 18, when a DL assignment is notified of by means of an R-PDCCH region in slot 0, it is necessary to process a PDSCH within $7/14+3-t_{TA}=3.5-t_{TA}$ ms. Therefore, the maximum transport block size when a DL assignment is notified of by means of the R-PDCCH region in slot 0 is $(3.5-t_{TA\_MAX})/(3.8-t_{TA})$ times the maximum transport block size when a DL assignment is notified of by means of the PDCCH region. Similarly, when a DL assignment is notified of by means of an R-PDCCH region in slot 1, it is necessary to process a PDSCH within $3.0-t_{TA}$ ms. Therefore, the maximum transport block size when a DL assignment is notified of by means of the R-PDCCH region in slot 1 is $(3.0-t_{TA})/(3.8-t_{TA\_MAX})$ times the maximum transport block size when a DL assignment is notified of by means of the PDCCH region. That is, in this case, the "restriction rate of the maximum transport block size" is $(3.5-t_{TA\_MAX})/(3.8-t_{TA})$ times when a DL assignment is notified of by means of the R-PDCCH region in slot 0, and is $(3.0-t_{TA})/(3.8-t_{TA\_MAX})$ times when a DL assignment is notified of by means of the R-PDCCH region in slot 1.

In addition, a transport block size is restricted by applying a restriction to a combination of a transport size index (I_TBS) and a number of allocated resource blocks (N_PRB) based on an R-PDCCH region to which DCI (DL assignment) is allocated. However, the present invention is not limited to only this method. Other specific restriction methods are the same as those described in Embodiment 1, and hence a description of such methods is omitted here.

Alternatively, as a simple method of restricting a transport block size based on a TA value, a method is available that multiplies a transport block size of an (R-)PDSCH in a case where DCI is allocated to an R-PDCCH region by the "restriction rate of the maximum transport block size" that corresponds to the TA value. For example, when pipeline processing is assumed in which the processing times of the respective processing operations are less than or equal to 1 ms, when the TA value is greater than or equal to 0 ms and is less than 0.66/4=0.165 ms, a transport block size of an (R-)PDSCH when DCI is allocated to the R-PDCCH region in slot 1 is less than a value obtained by multiplying the transport block size of a PDSCH in a case where DCI is allocated to the PDCCH region by $(1-11/14+(0.66-0.165))\div 1 \approx 0.71$. Similarly, when the TA value is greater than or equal to 0.165 ms and is less than 0.33 ms, the transport block size is less than a value obtained by multiplying by $(1-11/14+(0.66-0.33))\div 1 \approx 0.55$, when the TA value is greater than or equal to 0.33 ms and less than 0.495 ms, the transport block size is less than a value obtained by multiplying by $(1-11/14+(0.66-0.495))\div 1 \approx 0.38$, and when the TA value is greater than or equal to 0.495 ms and is less than or equal to 0.66 ins, the transport block size is less than or equal to a value obtained by multiplying by $(1-11/14+(0.66-0.66))\div 1 \approx 0.21$.

However, whichever method is used, a transport block size of an (R-)PDSCH when DCI is allocated to an R-PDCCH region must not exceed a value obtained by multiplying a maximum transport block size of a PDSCH when DCI is allocated to the PDCCH region by the "restriction rate of the maximum transport block size."

(Embodiment 8)

Embodiment 8 relates to a combination of the technology according to Embodiment 7 and the technology according to Embodiment 2. That is, according to Embodiment 8, when there are a plurality of resource regions as mapping region candidates that correspond to a downlink data size, an order of priority in which the plurality of resource regions are to be configured as a mapping region is set. The base station and the terminal according to Embodiment 8 share the same basic configurations as those in Embodiment 7.

That is, according to the present embodiment, with respect to allocation control information targeted for processing that indicates a downlink data size that is greater than a maximum size value for an $n+1^{th}$ resource region and is less than or equal to a maximum size value for an $n^{th}$ resource region, configuration section 101 in base station 100 configures any one of a second to the $n^{th}$ resource region as the mapping region with priority over a first resource region.

It is thereby possible to reduce the possibility itself of a situation arising in which allocation of a PDCCH region is tight.

Note that, similarly to Embodiment 7, this method of configuring a mapping region is not limited to allocation control information (DCI), and can also be applied to uplink control information.

(Embodiment 9)

Embodiment 9 relates to a combination of the technology according to Embodiment 7 and the technology according to Embodiment 3. That is, according to Embodiment 9 also, similarly to Embodiment 8, when there are a plurality of resource regions as mapping region candidates that correspond to a downlink data size, an order of priority in which the plurality of resource regions are to be configured as a mapping region is set. The base station and the terminal according to Embodiment 9 share the same basic configurations as those in Embodiment 7. Accordingly, a description will be provided referring back to FIGS. 7 and 8.

In base station 100 of Embodiment 9, when there are a plurality of resource regions as mapping region candidates that correspond to a downlink data size, configuration section 101 configures a certain resource region as a mapping region with priority over other resource regions.

This configuration of a mapping region is performed, for example, as follows.

(1) When a transport size indicated by DCI targeted for processing is less than or equal to $16152+75376 \times (t_{TA\_MAX}-t_{TA})$ bits (i.e., when the downlink data size is small), configuration section 101 sets the order of priority as, first, the R-PDCCH region in slot 0, second, the R-PDCCH region in slot 1, and third, the PDCCH region, and configures a mapping region according to this order of priority.

(2) When a transport size indicated by DCI targeted for processing is greater than 16152 bits$+75376\times(t_{TA\_MAX}-t_{TA})$ and is less than or equal to $53840+75376\times(t_{TA\_MAX}-t_{TA})$ bits (i.e., when the downlink data size is a medium size), configuration section 101 sets the order of priority as, first, the R-PDCCH region in slot 1, and second, the PDCCH region, and configures a mapping region according to this order of priority. Since $16152+75376\times(t_{TA\_MAX}-t_{TA})$ bits exceed the maximum size value of the R-PDCCH region in slot 0, the R-PDCCH region in slot 0 is excluded from the mapping region candidates. That is, the R-PDCCH region in slot 1 is configured as a mapping region with priority over the PDCCH region.

(3) When a transport size indicated by DCI targeted for processing is greater than $53840+75376\times(t_{TA\_MAX}-t_{TA})$ bits (i.e., when the downlink data size is large), configuration section 101 configures the PDCCH region as a mapping region.

Similar effects as in Embodiment 8 may be attained by the above method of configuring a mapping region also.

According to the present embodiment as described above, with respect to DCI targeted for processing that indicates a downlink data size that is greater than a maximum size value for an $n+1^{th}$ (n being a natural number between 2 and N, inclusive) resource region and is less than or equal to a maximum size value for an $n^{th}$ resource region, configuration section 101 configures the $n^{th}$ resource region as a mapping region with priority over a first to an $n-1^{th}$ resource regions.

It is thereby possible to reduce the possibility itself of a situation arising in which allocation of a PDCCH region is tight.

Note that, similarly to Embodiment 7, this method of configuring a mapping region is not limited to allocation control information (DCI), and can also be applied to uplink control information.

(Embodiment 10)

Although according to Embodiments 7 to 9 a downlink data size is defined as a transport block size, according to Embodiment 10 a downlink data size is defined as a product of a code block size and the number of code blocks. The base station and the terminal according to Embodiment 10 share the same basic configurations as those in Embodiment 7. Accordingly, a description will be provided referring back to FIGS. 7 and 8.

That is, in practice, the operation of a turbo decoder in a terminal is dependent on a plurality of code block sizes that are calculated on the basis of a transport block. Accordingly, in Embodiment 10, configuration section 101 configures a mapping region in which DCI is mapped, from among a PDCCH region, an R-PDCCH region in slot 0, and an R-PDCCH region in slot 1 that are provided in sequential order in the time direction within a subframe, in accordance with a product of a code block size and the number of code blocks.

Accordingly, a maximum size value of a downlink data size that is indicated by DCI that can be configured in each resource region is also defined by a product of a code block size and the number of code blocks.

In this case, a maximum value that may be set as a maximum size value can be calculated in the manner described below.

A maximum value of a "product of a code block size and the number of code blocks" when DCI is allocated to a PDCCH is 5824 (code block size)×13 (number of code blocks)=75712 bits. This is because CRC bits including 24 bits for each code block and the transport block are added to the maximum transport block size (=75376). That is, a total of 336 bits are added that include 24×13 (number of code blocks)=312 bits as CRC for the code blocks and 24 bits as CRC for the transport block. Further, the number of code blocks is determined as an integer obtained by dividing a value obtained by adding CRC for the transport block to the transport block size by a segmentation size=6144 and rounding up any digits after the decimal point of the resultant value. That is, since (75376+24)/6144=12.27 . . . , the number of code blocks is calculated as 13.

Therefore, a maximum value of values that may be assumed for a "product of a code block size and the number of code blocks" is 75712×(1−(4/14−($t_{TA\_MAX}-t_{TA}$)))=54080+($t_{TA\_MAX}-t_{TA}$) when DCI is allocated to the R-PDCCH region in slot 0, and is 75712×(1−(11/14−($t_{TA\_MAX}-t_{TA}$)))=16224+($t_{TA\_MAX}-t_{TA}$) when DCI is allocated to the R-PDCCH region in slot 1.

A transport block size when DCI is allocated to the R-PDCCH region in slot 0 and when DCI is allocated to the R-PDCCH region in slot 1 can be calculated back from a "product of a code block size and the number of code blocks."

Note that, since a code block size that may be assumed is a discrete value, code block sizes are made to correspond to a transport block size by using a first code block and a second code block of different sizes. Further, since a transport block size is also a discrete value, filler bits may be added to correspond to a discrete, specified transport block size.

In practice, it is sufficient if the operation time of a turbo decoder is less than or equal to 1 ms. Accordingly, if it is assumed that a "product of a code block size and the number of code blocks" when DCI is allocated to a PDCCH is 75712, the maximum transport block size when DCI is allocated to an R-PDCCH region in slot 0 is less than or equal to 54080+($t_{TA\_MAX}-t_{TA}$). Further, the maximum transport block size when DCI is allocated to an R-PDCCH region in slot 1 is less than or equal to 16224+($t_{TA\_MAX}-t_{TA}$).

Further, in the description above, pipeline processing is assumed in which the processing times of the respective processing operations are less than or equal to 1 ms so that the operation time of a turbo decoder per subframe is less than or equal to 1.0 ms so as to conform to the subframe length (1.0 ms) (see FIG. 11 and FIG. 17). In this case, FIG. 11 illustrates pipeline processing in a case where a terminal is notified of a DL assignment by means of a PDCCH region.

FIG. 17 illustrates pipeline processing in a case where a DL assignment is notified of by means of an R-PDCCH region in slot 0. When a DL assignment is notified of by means of the R-PDCCH region in slot 0, although the blind decoding start time is delayed by 4/14 ms in comparison to when a DL assignment is notified of by means of the PDCCH region, the timing for notifying of an error detection result is not delayed. Consequently, when performing pipeline processing in which processing times of the respective processing operations are less than or equal to 1 ms, the maximum value of the "product of a code block size and the number of code blocks" when a DL assignment is notified of by means of the R-PDCCH region in slot 0 is (1−4/14+($t_{TA\_MAX}-t_{TA}$))÷1≈0.71+($t_{TA\_MAX}-t_{TA}$) times the maximum value of the "product of a code block size and the number of code blocks" when a DL assignment is notified of by means of the PDCCH region. Similarly, when a DL assignment is notified of by means of the R-PDCCH region in slot 1, the maximum value is (1−11/14+($t_{TA\_MAX}-t_{TA}$))÷1≈0.21+($t_{TA\_MAX}-t_{TA}$) times the maximum value when a DL assignment is notified of by means of the PDCCH region.

On the other hand, more generally, quadruple parallel processing can also be performed with respect to a PDSCH in four downlink subframes (see FIG. 13 and FIG. 18). As shown in FIG. 13, in this quadruple parallel processing, when a DL assignment is notified of by means of a PDCCH region, it is sufficient to process a PDSCH that has a maximum value of a "product of a code block size and the number of code blocks" within 11/14+3−$t_{TA\_MAX}$≈3.8−$t_{TA\_MAX}$ ms. In contrast, as shown in FIG. 18, when a DL assignment is notified of by means of an R-PDCCH region in slot 0, it is necessary to process a PDSCH within 7/14+3−$t_{TA}$=3.5−$t_{TA}$ ms. Therefore, the maximum value of a "product of a code block size and the number of code blocks" when a DL assignment is notified of by means of the R-PDCCH region in slot 0 is (3.5−$t_{TA}$)/(3.8−$t_{TA\_MAX}$) times the maximum transport block size when a DL assignment is notified of by means of the PDCCH region. Similarly, when a DL assignment is notified of by means of the R-PDCCH region in slot 1, it is necessary to process a PDSCH within 3.0−$t_{TA}$ ms. Therefore, the maximum value of a "product of a code block size and the number of code blocks" when a DL assignment is notified of by means of the R-PDCCH region in slot 1 is (3.0−$t_{TA}$)/(3.8−$t_{TA\_MAX}$) times the maximum value of a "product of a code block size and the number of code blocks" when a DL assignment is notified of by means of the PDCCH region. Specifically, in quadruple parallel processing, a "restriction rate of the maximum value of a product of a code block size and the number of code blocks" is (3.5−$t_{TA}$)/(3.8−$t_{TA\_MAX}$) times when a DL assignment is notified of by means of the R-PDCCH region in slot 0, and is (3.0−$t_{TA}$)/(3.8−$t_{TA\_MAX}$) times when a DL assignment is notified of by means of the R-PDCCH region in slot 1.

(Embodiment 11)

Although according to Embodiments 7 to 9 a downlink data size is defined as a transport block size, according to Embodiment 11 a downlink data size is defined as an MCS (I_MCS) that corresponds to a number of allocated resource blocks (N_PRB). The base station and the terminal according to Embodiment 11 share the same basic configurations as those in Embodiment 7. Accordingly, a description will be provided referring back to FIGS. 7 and 8.

That is, as described above, a transport block size is defined by a number of allocated resource blocks (N_PRB), an MCS (I_MCS), and a TA value included in DCI. Therefore, in Embodiment 11, in accordance with an MCS (I_MCS) that corresponds to a number of allocated resource blocks (N_PRB) and a TA value, configuration section 101 configures a mapping region in which DCI is mapped, from among a PDCCH region, an R-PDCCH region in slot 0, and an R-PDCCH region in slot 1 that are provided in sequential order in the time direction within a sub frame.

Accordingly, a maximum size value of a downlink data size that is indicated by DCI that can be configured in each resource region is also defined by an MCS (I_MCS) that corresponds to a number of allocated resource blocks (N_PRB) and a TA value. In this case, it is necessary for a maximum transport block size when DCI is to be allocated to an R-PDCCH region to be less than or equal to the values defined in Embodiments 7 to 10.

Based on the foregoing, for example, in tables in which MCS indices (I_MCS) and transport size indices (I_TBS) are associated with each other that are shown in FIG. 15, the MCS indices (I_MCS) and transport size indices (I_TBS) are divided into three groups. Further, the tables in which the MCS indices (I_MCS) and the transport size indices (I_TBS) are associated with each other are stored for each range of the number of allocated resource blocks (N_PRB). FIG. 15A is a table corresponding to a range in which the number of allocated resource blocks (N_PRB) is from 81 to 90. FIG. 15B is a table corresponding to a range in which the number of allocated resource blocks (N_PRB) is from 91 to 100.

In the tables in FIG. 15, in region 1, MCS indices (I_MCS) are defined for which mapping is performed only to the PDCCH region, and is not performed to the R-PDCCH region in slot 0 or the R-PDCCH region in slot 1. In region 2, MCS indices (I_MCS) are defined for which mapping is performed only to the R-PDCCH region in slot 0 or the PDCCH region, and is not performed to the R-PDCCH region in slot 1. Further, in region 3, MCS indices (I_MCS) are defined for which mapping is performed to the R-PDCCH region in slot 0, the R-PDCCH region in slot 1, and the PDCCH region. Furthermore, the regions denoted as region 1, region 2, and region 3 fluctuate based on the TA value. More specifically, since a transport block size can be increased as the TA value decreases, the boundary between region 3 and region 2 transits downward within the tables in FIG. 15. At the same time, the boundary between region 2 and region 1 also transits downward within the tables in FIG. 15. If the TA value is less than $t_{TA\_MAX}-4/14$ ms, the boundary between region 2 and region 1 transits as far as the lower limit within the table in FIG. 15. Accordingly, in this case, region 1 disappears.

(Embodiment 12)

According to Embodiments 7 to 11, the amount of information (i.e. the number of DCI bits) to be communicated by DCI is decreased by providing a maximum size value for a downlink data size indicated by DCI that can be configured in each resource region. Embodiment 12 illustrates application variations with respect to the decreased number of bits.

That is, as shown in FIG. 15, since I_MCS may assume a value from 0 to 31, the number of bits of I_MCS is five. However, when N_PRB is from 91 to 100, the maximum value of I_MCS of the R-PDCCH region in slot 1 is 10. Therefore, four bits are adequate as the number of bits of I_MCS in the R-PDCCH region in slot 1. That is, the number of DCI bits is decreased by one bit.

In this connection, since application variations that utilize the decreased number of DCI bits are the same as described in Embodiment 6, descriptions of those application variations are omitted here.

(Other Embodiments)

Figure 3:
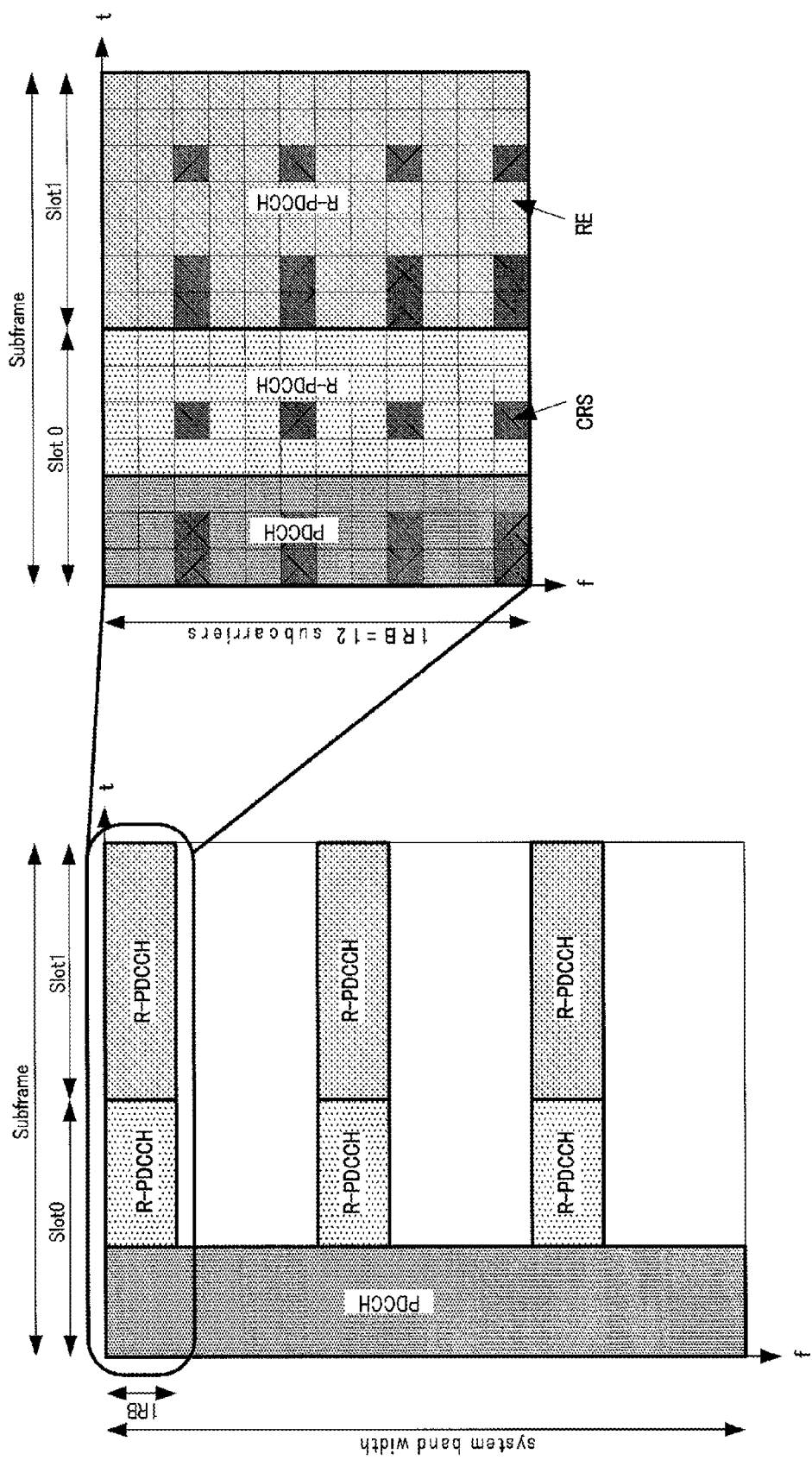
FIG. 3 illustrates an example of R-PDCCH regions.
Figure 4:
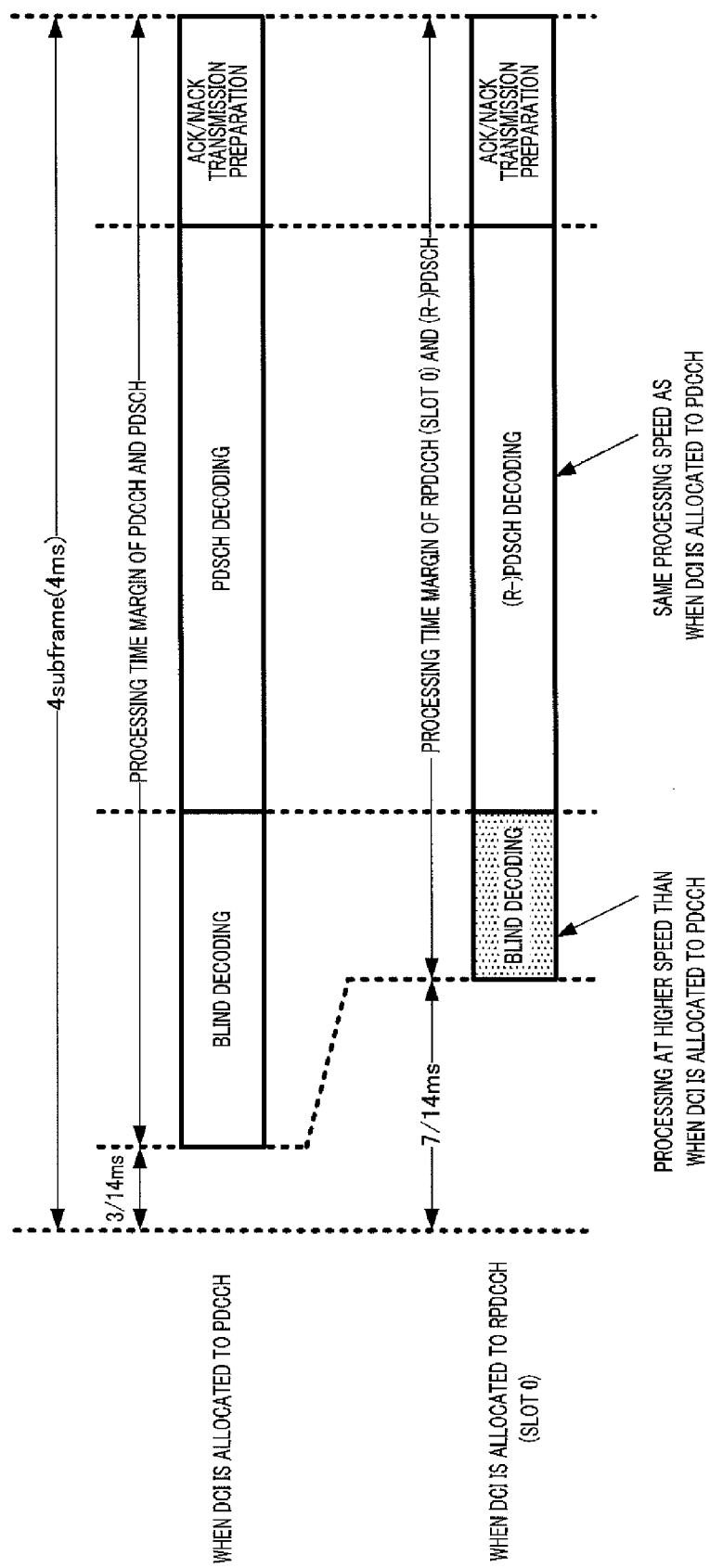
FIG. 4 is a diagram for explaining an example of operations of a terminal.
Figure 5:
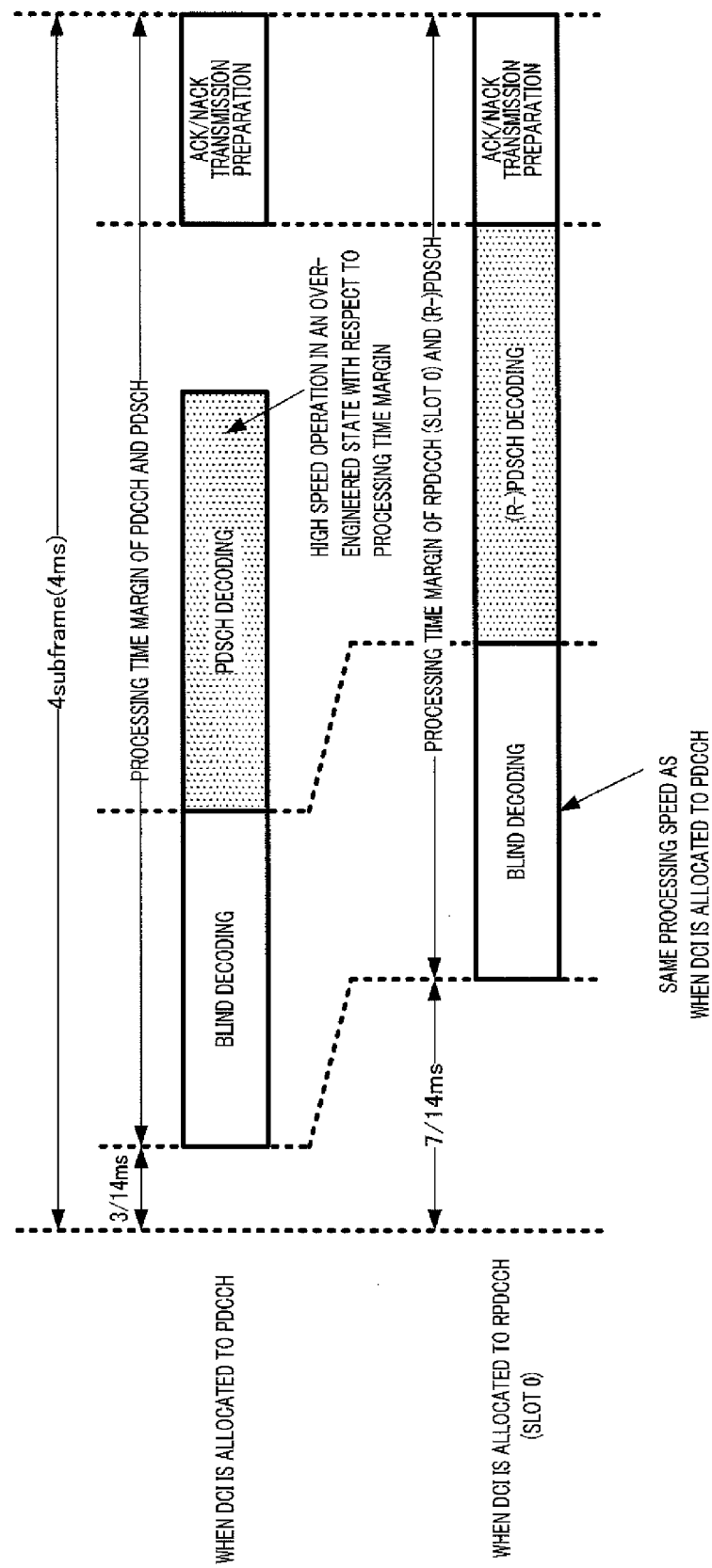
FIG. 5 is a diagram for explaining an example of operations of a terminal.

[1] In the respective embodiments described above, an R-PDCCH may also be configured in a region that straddles slot and slot 1. For example, an R-PDCCH region may be configured from the fourth OFDM symbol to the last OFDM symbol in slot 1, or from the next OFDM symbol after the last OFDM symbol of the PDCCH region to the last OFDM symbol in slot 1. Further, an R-PDCCH region may also be configured in OFDM symbol units. That is, allocation positions in the frequency direction in an R-PDCCH region are not limited to the regions shown in FIG. 3.

Figure 19:
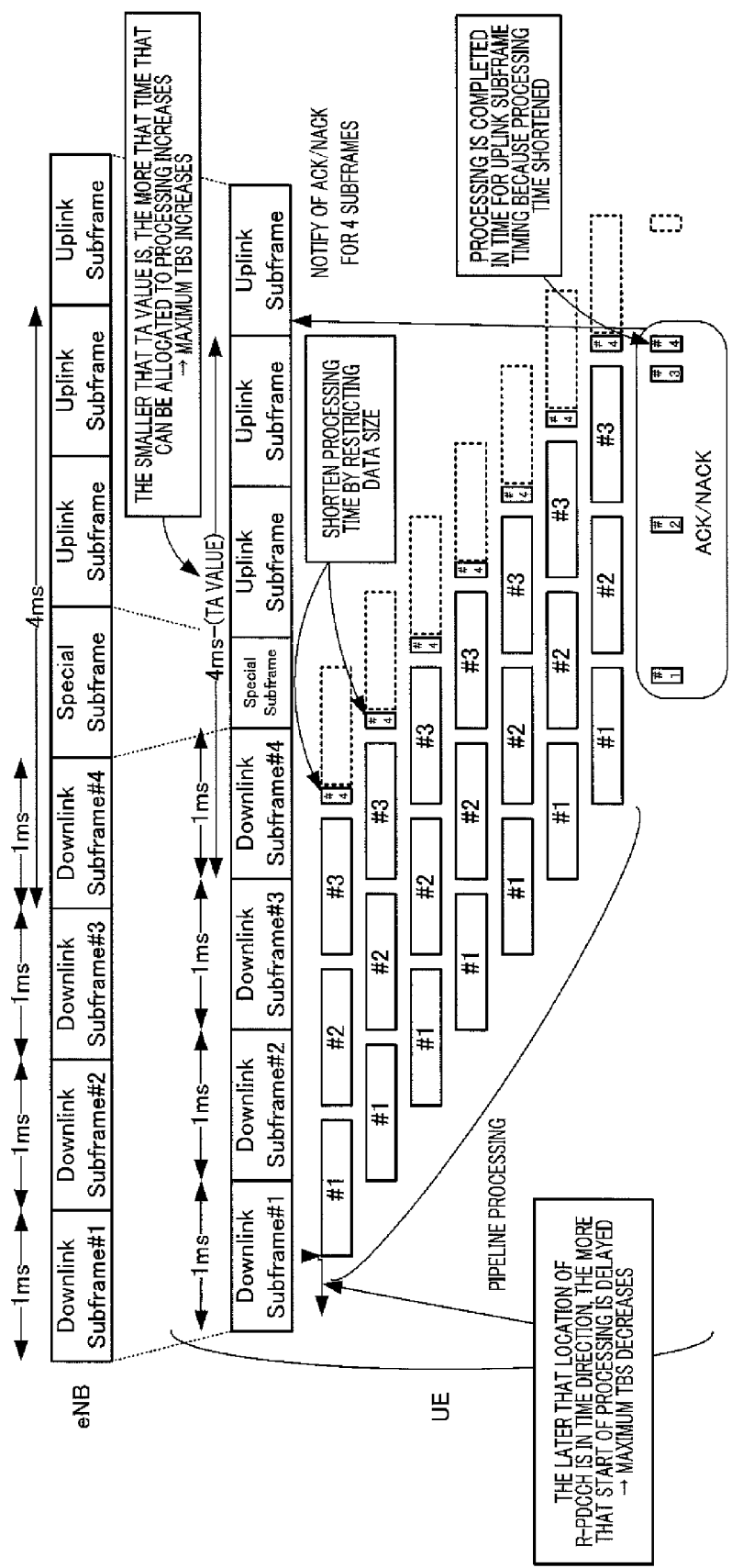
FIG. 19 is a diagram for explaining a maximum size value of a downlink data size indicated by a DL assignment according to another embodiment of the present invention.

[2] In the respective embodiments described above, at a time of TDD operation, when using an uplink subframe that is four subframes after a downlink subframe to notify of a result of error detection on downlink data in the downlink subframe, the respective configurations described in the following (1) and (2) may be adopted (see FIG. 19). (1) In the relevant downlink subframe only, a maximum size value of a downlink data size indicated by a DL assignment in an R-PDCCH region is configured to be smaller than a maximum size value of a downlink data size indicated by a DL assignment in a PDCCH region. (2) In a downlink subframe other than the relevant downlink subframe, a maximum size value of a downlink data size indicated by a DL assignment in an R-PDCCH region and a maximum size value of a downlink data size indicated by a DL assignment in a PDCCH region are configured to be the same value.

[3] In Embodiments 7 to 12, a round-trip propagation delay amount between a base station and a terminal may be used instead of a TA value. Note that, although a TA value is generally set to a propagation delay amount between a base station and a terminal, a TA value need not necessarily be set in that manner. A TA value represents a setting value that shows how much to advance a transmission time at a terminal, and, for example, in some cases a TA value is set to a larger value than a propagation delay between a relay station and a terminal.

In addition, in Embodiments 7 to 12, a UE Rx–Tx time difference for an RRC message that is notified of from a terminal may be used instead of a TA value. A UE Rx–Tx time difference represents a difference between a timing of downlink radio frame #i that is received by a terminal and a timing of uplink radio frame #i that the terminal transmits.

[4] In some cases, R-PDCCH of the respective embodiments described above is represented as E (enhanced or extended)-PDCCH.

[5] A maximum size value of a downlink data size in the respective embodiments described above is a maximum transport block size with respect to a maximum number of layers that the terminal supports.

[6] In the respective embodiments described above, an example of allocating the number of blind decoding operations that is described below may be adopted.

Even when DCI intended for a terminal under the control of a base station is also disposed in an R-PDCCH region, similarly to a PDCCH, each R-PDCCH occupies a resource composed of one or a plurality of consecutive relay-control channel elements (R-CCEs). Further, the number of R-CCEs occupied by an R-PDCCH (R-CCE aggregation level: relay CCE aggregation level) is selected from 1, 2, 4, and 8 depending on the number of information bits of allocation control information or the condition of a propagation path of a terminal.

However, simply adding an R-PDCCH region to a PDCCH region as a resource region for transmitting DCI to a terminal connected to a base station (terminal under the control of a base station) may disadvantageously lead to an increase in the number of blind decoding operations to be performed by the terminal, resulting in increases in power consumption, processing delay, and circuit scale of the terminal. For example, in one subframe, when a search space is configured for each of a PDCCH region and an R-PDCCH region, if the number of blind decoding operations to be performed by a terminal in each region is 60, the terminal would perform 120 blind decoding operations (=60×2 regions) in total for each subframe. In other words, the number of blind decoding operations increases and the configuration of a terminal becomes complicated.

Also, another possible configuration method might be one where a search space is allocated to each of a PDCCH region and R-PDCCH regions in such a manner that the total number of region candidates for blind decoding (i.e., the total number of blind decoding operations) by a terminal in one subframe is made to be generally comparable to the abovementioned related art (e.g., 60 operations). In this case, however, the size of the search space in each of the PDCCH region and the R-PDCCH region becomes approximately ½, and thus the possibility that the base station becomes unable to allocate CCEs to DCI for a specific terminal (i.e., a blocking probability) may increase. Therefore, the necessity arises for the base station to change the transmission timing of control signals for the relevant terminal or use a CCE aggregation level that is different from an adequate CCE aggregation level. However, a transmission delay arises when the transmission timing of control signals is changed. Further, making the CCE aggregation level unnecessarily large will mean that resources of an R-PDCCH region are wastefully used. Conversely, decreasing the CCE aggregation level will mean that it will not be possible to satisfy a desired communication quality with respect to the relevant terminal.

Therefore, it may lead to a drop in system throughput as a result of not being able to use resources efficiently. Accordingly, a method is desired that, when DCI intended for a terminal under the control of the base station is transmitted using a PDCCH region and an R-PDCCH region, is capable of preventing a reduction in the flexibility of resource allocation at the base station without increasing the number of blind decoding operations performed at the terminal.

In this case, the larger that a TA value is, the smaller that a maximum transport block size with which DCI (DL assignment) can be allocated to an R-PDCCH region becomes and the higher the possibility is that a DL assignment with respect to a large transport block will be allocated to a PDCCH region, and hence the possibility that the DL assignment will be allocated to an R-PDCCH region decreases. Therefore, the smaller that a maximum transport block size in a case where a DL assignment is allocated to an R-PDCCH region is in comparison to a maximum transport block size in a case where a DL assignment is allocated to a PDCCH region, the smaller the allocated number of blind decoding operations in a PDCCH region will be relative to the number of blind decoding operations in a R-PDCCH region. Thus, a reduction in the flexibility of resource allocation at the base station can be prevented without increasing the number of blind decoding operations performed at the terminal.

FIG. 20 is a diagram for explaining an example of disposing the number of blind decoding operations. FIGS. 20A to 20D illustrate examples of allocating the number of blind decoding operations to a PDCCH region and an R-PDCCH region. The total number of blind decoding operations in each of FIGS. 20A to 20D is 16. In FIG. 20A, the number of blind decoding operations are allocated to only a PDCCH region. In FIG. 20B and FIG. 20C, the proportion of the number of blind decoding operations allocated to an R-PDCCH region increases in the order of FIG. 20B and FIG. 20C. In FIG. 20D, the number of blind decoding operations are allocated to only an R-PDCCH region. In addition, a method of allocating the number of blind decoding operations with respect to a TA value is determined according to a table shown in FIG. 20E. That is, the larger that the TA value is, the greater the increase in the number of blind decoding operations in a PDCCH region, while the smaller that the TA value is, the greater the increase in the number of blind decoding operations in an R-PDCCH region. Note that, as used herein, the term "number of blind decoding operations" may refer to the total number of blind decoding operations in each (R-)PDCCH region (for example, the total number of blind decoding operations in a PDCCH region in FIG. 20B is 10), or may refer to the number of blind decoding operations for each CCE aggregation level in each (R-)PDCCH region.

Note that, although in FIG. 20 the numbers of blind decoding operations of R-PDCCH regions in slot 0 and in slot 1 are put together, the present invention is not limited thereto, and the respective numbers of blind decoding operations in R-PDCCH regions in slot 0 and in slot 1 may be configured independently.

[7] In the foregoing embodiments, descriptions were provided with respect to antennas. However, the claimed invention is similarly applicable to antenna ports.

The term "antenna port" refers to a logical antenna including one or more physical antennas. In other words, the term "antenna port" does not necessarily refer to a single physical antenna, and may sometimes refer to an array antenna including a plurality of antennas, and/or the like.

For example, 3GPP LTE does not specify the number of physical antennas in an antenna port, but specifies an antenna port as a minimum unit in which a base station can transmit different reference signals.

An antenna port may also be specified as a minimum unit by which weightings of precoding vectors are multiplied.

[8] In the foregoing embodiments, the claimed invention is configured with hardware by way of example, but the claimed invention may also be provided by software in cooperation with hardware.

The functional blocks used in the descriptions of each of the foregoing embodiments may typically be implemented as an LSI, which is an integrated circuit. They may be individual chips, or some of or all of them may be integrated into a single chip. The term "LSI" is used here, but the terms "IC," "system LSI," "super LSI," or "ultra LSI" may also be adopted depending on the degree of integration.

Alternatively, circuit integration may also be implemented using a dedicated circuit or a general-purpose processor other than an LSI. An FPGA (field programmable gate array) which is programmable after LSI manufacturing, or a reconfigurable processor which allows reconfiguration of connections and settings of circuit cells in an LSI may be used.

Should a circuit integration technology replacing LSI appear as a result of advancements in semiconductor technology or other derivative technology, the functional blocks could be integrated using such a technology. Biotechnology applications, and/or the like, are conceivable prospects.

The disclosure of the specification, the drawings, and the abstract included in Japanese Patent Application No. 2010-221368, filed on Sep. 30, 2010 and in Japanese Patent Application No. 2011-174891, filed on Aug. 10, 2011 is incorporated herein by reference in their entirety.

INDUSTRIAL APPLICABILITY

The transmission apparatus and transmission method of the present invention are useful in that they are capable of allowing leeway in data reception processing on a receiving side regardless of a time position of a resource region to which control information containing resource allocation information for transmission data is mapped.

REFERENCE SIGNS LIST

100 Base station
101 Configuration section
102 Control section
103 Search space configuration section
104 PDCCH generating section
105, 106, 107 Coding/modulating section
108 Allocating section
109 Multiplexing section
110, 213 IFFT section
111, 214 CP adding section
112, 215 Radio transmitting section
113, 201 Antenna
114, 202 Radio receiving section
115, 203 CP removing section 116, 204 FFT section
117 Extracting section
118 IDFT section
119 Data receiving section
120 ACK/NACK receiving section
131 Transmission region configuration section
132 Transmission mode configuration section
200 Terminal
205 Demultiplexing section
206 Configuration information receiving section
207 PDCCH receiving section
208 PDSCH receiving section
209, 210 Modulating section
211 DFT section
212 Mapping section

The invention claimed is:

1. A transmission apparatus comprising:
a configuration section that configures a mapping region in which control information is mapped, the control information including information about a resource region allocated to transmission data and data size information about a size of the transmission data, the configuration section configuring the mapping region for control information targeted for processing, in accordance with a data size indicated by the control information targeted for processing, from among first to $N^{th}$ (N being a natural number no less than 2) resource regions provided in sequential order in a time direction within a communication unit time; and
a mapping control section that maps the control information targeted for processing to the configured mapping region and transmits the control information.

2. The transmission apparatus according to claim 1, further comprising:
a configuration rule table in which the first to $N^{th}$ resource regions and maximum size values of downlink data sizes indicated by control information that can be configured in each resource region are associated with each other, and in which a maximum size value for the $n^{th}$ (n being a natural number between 2 and N, inclusive) resource region among the first to $N^{th}$ resource regions is smaller than a maximum size value for the $n-1^{th}$ resource region;
wherein the configuration section configures the mapping region based on a data size indicated by the control information targeted for processing and the configuration rule table.

3. The transmission apparatus according to claim 2, wherein with respect to control information targeted for processing that indicates a data size that is greater than a maximum size value for the $n+1^{th}$ resource region and is less than or equal to the maximum size value for the $n^{th}$ resource region, the configuration section configures the $n^{th}$ resource region as the mapping region with priority over the first to $n-1^{th}$ resource regions.

4. The transmission apparatus according to claim 2, wherein with respect to control information targeted for processing that indicates a downlink data size that is greater than a maximum size value for the $n+1^{th}$ resource region and is less than or equal to the maximum size value for the $n^{th}$ resource region, the configuration section configures any one of a second to the $n^{th}$ resource regions as the mapping region with priority over the first resource region.

5. The transmission apparatus according to claim 1, wherein the data size is defined as a transport block size.

6. The transmission apparatus according to claim 1, wherein the data size is defined as a product of a code block size and a number of code blocks.

7. The transmission apparatus according to claim 1, wherein the data size is defined as an MCS corresponding to a number of allocated resource blocks.

8. A transmission method comprising:
configuring a mapping region in which control information is mapped, the control information including information about a resource region allocated to transmission data and data size information about a size of the transmission data, wherein the mapping region for control information targeted for processing is configured in accordance with a data size indicated by the control information targeted for processing, from among first to $N^{th}$ (N being a natural number no less than 2) resource regions that are provided in sequential order in a time direction within a communication unit time; and
mapping the control information targeted for processing to the configured mapping region and transmitting the control information.

9. A transmission apparatus comprising:
a configuration section that configures a mapping region in which control information is mapped, the control information including information about a resource region allocated to transmission data and data size information about a size of the transmission data, the configuration section configuring the mapping region for control information targeted for processing, in accordance with a data size indicated by the control information targeted for processing, from among first to $N^{th}$ (N being a natural number no less than 2) resource regions provided in sequential order in a time direction within a communication unit time; and
a mapping control section that maps the control information targeted for processing to the configured mapping region and transmits the control information, wherein
among the first to Nth resource regions, a maximum size value for the first resource region is configured in accordance with a maximum value of a timing advance value, maximum size values for the second to $N^{th}$ (N being a natural number no less than 2) resource regions are configured in accordance with the timing advance value, and in order to cause reception timings of signals transmitted from a plurality of receiving apparatuses that receive the transmission data and the control information to match, the timing advance value is transmitted from the transmission apparatus to each of the plurality of receiving apparatuses.

10. The transmission apparatus according to claim 9, further comprising:
a configuration rule table in which the first to $N^{th}$ resource regions and maximum size values of downlink data sizes indicated by control information that can be configured in each resource region are associated with each other, and in which a maximum size value for the $n^{th}$ (n being a natural number between 2 and N, inclusive) resource region among the first to $N^{th}$ resource regions is less than or equal to a maximum size value for the $n-1^{th}$ resource region;
wherein, with respect to the first resource region, the configuration section configures the mapping region based on the configuration rule table and a data size indicated by the control information targeted for processing and the maximum value, and with respect to the $n^{th}$ resource region, the configuration section configures the mapping region based on the configuration rule table and a data size indicated by the control information targeted for processing and the timing advance value.

11. The transmission apparatus according to claim 10, wherein with respect to control information targeted for processing that indicates a data size that is greater than a maximum size value for the n+1$^{th}$ resource region and is less than or equal to the maximum size value for the n$^{th}$ resource region, the configuration section configures the n$^{th}$ resource region as the mapping region with priority over the first to n−1$^{th}$ resource regions.

12. The transmission apparatus according to claim 10, wherein with respect to control information targeted for processing that indicates a downlink data size that is greater than a maximum size value for the n+1$^{th}$ resource region and is less than or equal to the maximum size value for the n$^{th}$ resource region, the configuration section configures any one of the second to the n$^{th}$ resource region as the mapping region with priority over the first resource region.

13. The transmission apparatus according to claim 9, wherein the data size is defined as a transport block size.

14. The transmission apparatus according to claim 9, wherein the data size is defined as a product of a code block size and a number of code blocks.

15. The transmission apparatus according to claim 9, wherein the data size is defined as an MCS corresponding to a number of allocated resource blocks.

16. A transmission method, comprising:
- a step of configuring a mapping region in which control information is mapped, the control information including information about a resource region allocated to transmission data and data size information about a size of the transmission data, wherein the mapping region for control information targeted for processing is configured in accordance with a data size indicated by the control information targeted for processing, from among first to N$^{th}$ (N being a natural number no less than 2) resource regions that are provided in sequential order in a time direction within a communication unit time; and
- a step of mapping the control information targeted for processing to the configured mapping region and transmitting the control information, wherein
among the first to N$^{th}$ resource regions, a maximum size value for the first resource region is configured in accordance with a maximum value of a timing advance value, maximum size values for the second to N$^{th}$ (N being a natural number no less than 2) resource regions are configured in accordance with the timing advance value, and in order to cause reception timings of signals transmitted from a plurality of receiving apparatuses that receive the transmission data and the control information to match, the timing advance value is transmitted to each of the plurality of receiving apparatuses from an apparatus that performs the transmission method.

* * * * *